US008688588B2

(12) United States Patent
Holtzman et al.

(10) Patent No.: US 8,688,588 B2
(45) Date of Patent: Apr. 1, 2014

(54) METHOD FOR IMPROVING ACCURACY OF A TIME ESTIMATE USED IN DIGITAL RIGHTS MANAGEMENT (DRM) LICENSE VALIDATION

(75) Inventors: Michael Holtzman, Cupertino, CA (US); Rotem Sela, Maalot (IL); Ron Barzilai, Cupertino, CA (US); Fabrice E. Jogand-Coulomb, San Carlos, CA (US)

(73) Assignee: SanDisk Technologies Inc., Plano, TX (US)

( * ) Notice: Subject to any disclaimer, the term of this patent is extended or adjusted under 35 U.S.C. 154(b) by 874 days.

(21) Appl. No.: 11/811,354

(22) Filed: Jun. 8, 2007

(65) Prior Publication Data

US 2010/0024000 A1    Jan. 28, 2010

(51) Int. Cl.
 *G06Q 99/00*   (2006.01)
(52) U.S. Cl.
 CPC ............ *G06Q 99/00* (2013.01); *G06Q 2220/18* (2013.01)
 USPC ............................................. 705/59; 713/178
(58) Field of Classification Search
 USPC ............................................. 705/59; 713/178
 See application file for complete search history.

(56) References Cited

U.S. PATENT DOCUMENTS

| | | | |
|---|---|---|---|
| 5,444,780 A | 8/1995 | Hartman, Jr. | |
| 5,881,022 A | 3/1999 | Morganstein | |
| 5,892,900 A * | 4/1999 | Ginter et al. | 726/26 |
| 6,367,013 B1 * | 4/2002 | Bisbee et al. | 713/178 |
| 6,499,110 B1 * | 12/2002 | Moses et al. | 726/1 |
| 6,543,686 B1 | 4/2003 | Ritter | |
| 6,556,512 B1 * | 4/2003 | Winkler | 368/47 |
| 6,557,102 B1 | 4/2003 | Wong et al. | |
| 6,728,466 B1 | 4/2004 | Tanaka | |
| 6,728,880 B1 | 4/2004 | Sites | |
| 7,076,624 B2 | 7/2006 | Shaath et al. | |
| 7,194,092 B1 | 3/2007 | England et al. | |
| 7,219,234 B1 | 5/2007 | Ashland et al. | |

(Continued)

FOREIGN PATENT DOCUMENTS

CN             1540657         10/2004
DE    102005050352 A1     4/2007

(Continued)

OTHER PUBLICATIONS

European Examination Report for European Patent Application Serial No. 08 756 739.2 dated Aug. 23, 2010, 4 pages.

(Continued)

*Primary Examiner* — James D Nigh
(74) *Attorney, Agent, or Firm* — Brinks Gilson & Lione

(57) ABSTRACT

A method for improving accuracy of a time estimate used in digital rights management (DRM) license validation is disclosed. In one embodiment, a memory device receives a request to validate a DRM license stored on the memory device, wherein the DRM license is associated with a time stamp update policy (TUP) that specifies when a new time stamp is needed. Before attempting to validate the DRM license, the memory device determines if a new time stamp is needed based on the TUP associated with the DRM license. If a new time stamp is needed, the memory device receives the new time stamp and then attempts to validate the DRM license using a time estimate based on the new time stamp. Other embodiments are disclosed, and each of the embodiments can be used alone or together in combination.

33 Claims, 8 Drawing Sheets

(56) References Cited

U.S. PATENT DOCUMENTS

| | | | |
|---|---|---|---|
| 7,228,437 B2 | 6/2007 | Spagna et al. | |
| 7,536,524 B2 | 5/2009 | Shaath et al. | |
| 7,536,609 B2 | 5/2009 | Nakamura et al. | |
| 7,590,600 B2 | 9/2009 | Bovee et al. | |
| 7,793,135 B2 | 9/2010 | Dinescu | |
| 7,831,644 B2 | 11/2010 | Moritani et al. | |
| 7,831,795 B2 | 11/2010 | Prahlad et al. | |
| 7,891,009 B2 | 2/2011 | Jennings et al. | |
| 8,224,752 B2 | 7/2012 | Read et al. | |
| 8,346,807 B1 | 1/2013 | Diamond et al. | |
| 2001/0054134 A1 | 12/2001 | Nagatomo et al. | |
| 2002/0013772 A1 | 1/2002 | Peinado | |
| 2002/0120465 A1 | 8/2002 | Mori et al. | |
| 2002/0169974 A1 | 11/2002 | McKune | |
| 2002/0194010 A1 | 12/2002 | Bergler et al. | |
| 2003/0069854 A1 | 4/2003 | Hsu et al. | |
| 2003/0115469 A1 | 6/2003 | Shippy et al. | |
| 2004/0199578 A1 | 10/2004 | Kapczynski et al. | |
| 2004/0215909 A1* | 10/2004 | Imai et al. | 711/163 |
| 2005/0038757 A1 | 2/2005 | Wada | |
| 2005/0100113 A1 | 5/2005 | Corts et al. | |
| 2005/0181761 A1 | 8/2005 | Park | |
| 2005/0187943 A1 | 8/2005 | Finke-Anlauff et al. | |
| 2006/0095553 A1 | 5/2006 | Ogawa et al. | |
| 2006/0107042 A1 | 5/2006 | Kohmoto | |
| 2006/0218404 A1 | 9/2006 | Ogura | |
| 2006/0242068 A1 | 10/2006 | Jogand-Coulomb et al. | |
| 2006/0248596 A1 | 11/2006 | Jain et al. | |
| 2006/0282696 A1 | 12/2006 | Inagaki | |
| 2006/0294593 A1 | 12/2006 | Eldar et al. | |
| 2007/0043667 A1 | 2/2007 | Qawami et al. | |
| 2007/0056042 A1 | 3/2007 | Qawami et al. | |
| 2007/0083763 A1 | 4/2007 | Itoh et al. | |
| 2007/0110074 A1 | 5/2007 | Bradley et al. | |
| 2007/0118608 A1 | 5/2007 | Egli | |
| 2007/0197197 A1 | 8/2007 | Minear | |
| 2007/0266256 A1 | 11/2007 | Shah et al. | |
| 2008/0010450 A1 | 1/2008 | Holtzman et al. | |
| 2008/0086423 A1 | 4/2008 | Waites | |
| 2008/0168247 A1 | 7/2008 | Goodwill et al. | |
| 2008/0270308 A1 | 10/2008 | Peterka et al. | |
| 2008/0304364 A1 | 12/2008 | Holtzman et al. | |
| 2008/0306710 A1 | 12/2008 | Holtzman et al. | |
| 2008/0307158 A1 | 12/2008 | Sinclair | |
| 2008/0307494 A1 | 12/2008 | Holtzman et al. | |
| 2008/0307495 A1 | 12/2008 | Holtzman et al. | |
| 2009/0113536 A1 | 4/2009 | Zhang et al. | |
| 2009/0133116 A1* | 5/2009 | Waisbard et al. | 726/17 |
| 2009/0287942 A1 | 11/2009 | Betouin et al. | |
| 2010/0024000 A1 | 1/2010 | Holtzman et al. | |

FOREIGN PATENT DOCUMENTS

| | | |
|---|---|---|
| EP | 0 586 256 B1 | 3/1994 |
| EP | 1 081 577 | 3/2001 |
| EP | 1 094 374 | 4/2001 |
| EP | 1 094 374 A | 4/2001 |
| GB | 2 316 517 A | 2/1998 |
| JP | H07-036559 | 2/1995 |
| JP | 2001-505341 | 4/2001 |
| JP | 2001-159690 | 6/2001 |
| JP | 2003-296278 | 10/2003 |
| JP | 2004-003928 | 1/2004 |
| JP | 2004-021341 | 1/2004 |
| JP | 2004-038247 | 2/2004 |
| JP | 2004-056793 | 2/2004 |
| JP | 2004-171544 | 6/2004 |
| JP | 2004-320510 | 11/2004 |
| JP | 2004-326278 | 11/2004 |
| JP | 2005-063079 | 3/2005 |
| JP | 2005-165963 | 6/2005 |
| JP | 2005-250613 | 9/2005 |
| JP | 2005-301333 | 10/2005 |
| JP | 2005-331461 | 12/2005 |
| JP | 2006-338583 | 12/2006 |
| JP | 2006/350496 | 12/2006 |
| JP | 2007-157135 | 6/2007 |
| WO | WO 2004/075525 | 9/2004 |
| WO | WO 2004/075525 A | 9/2004 |
| WO | WO 2006/018864 | 2/2006 |
| WO | WO 2006/069194 | 6/2006 |
| WO | WO 2007/030760 | 3/2007 |
| WO | WO 2007/148319 A | 12/2007 |

OTHER PUBLICATIONS

European Examination Report for European Patent Application Serial No. 08 770 229.6 dated Aug. 23, 2010, 5 pages.
European Examination Report for European Patent Application Serial No. 08 780 764.0 dated Aug. 23, 2010, 4 pages.
Office Action for U.S. Appl. No. 11/811,346, dated Aug. 16, 2010, 17 pages.
Office Action for U.S. Appl. No. 11/811,348, dated Aug. 13, 2010, 11 pages.
Office Action for U.S. Appl. No. 11/811,284, dated May 7, 2010, 108 pages.
Office Action for U.S. Appl. No. 11/811,289, dated Jun. 30, 2010, 20 pages.
Office Action for U.S. Appl. No. 11/811,344, dated Jun. 10, 2010, 7 pages.
Office Action for U.S. Appl. No. 11/811,345, dated Jun. 10, 2010, 12 pages.
Mills, "Network Time Protocol (Version 3) Specification, Implementation and Analysis", *Network Working Group*, Mar. 1992, 120 pages.
"Standard Deviation and Variance", *QuickMBA*, Sep. 19, 2002, 2 pages.
Office Action for Chinese Patent Application Serial No. 2008801002317.9, dated Sep. 25, 2012, 5 pages.
Office Action for Chinese Patent Application Serial No. 2008801023200, dated Sep. 21, 2012, 13 pages.
Office Action for Taiwanese Patent Application Serial No. 097121254, dated Aug. 13, 2012, 10 pages.
Notification of Reasons for Refusal for Japanese Patent Application Serial No. 2010-511334, dated Nov. 6, 2012, 8 pages.
English Translation of Office Action for Chinese Patent Application Serial No. 2008801024434 dated Aug. 23, 2013, 10 pages.
Notice of Allowance for U.S. Appl. No. 13/862,978 dated Oct. 3, 2013, 24 pages.
Office Action for U.S. Appl. No. 11/811,284, dated Dec. 17, 2012, 17 pages.
Decision for Refusal for Japanese Patent Application Serial No. 2010-511336, dated Dec. 11, 2012, 4 pages.
U.S. Appl. No. 11/811,284, entitled, "Method for Improving Accuracy of a Time Estimate From a Memory Device", filed Jun. 8, 2007.
U.S. Appl. No. 11/811,289, entitled, "Method for Improving Accuracy of a Time Estimate Used to Authenticate an Entity to a Memory Device", filed Jun. 8, 2007.
U.S. Appl. No. 11/811,344, entitled, "Memory Device With Circuitry for Improving Accuracy of a Time Estimate Used to Authenticate an Entity", filed Jun. 8, 2007.
U.S. Appl. No. 11/811,345, entitled, "Memory Device Using Time from a Trusted Host Device", filed Jun. 8, 2007.
U.S. Appl. No. 11/811,346, entitled, "Method for Using Time from a Trusted Host Device", filed Jun. 8, 2007.
U.S. Appl. No. 11/811,347, entitled, "Memory Device with Circuitry for Improving Accuracy of a Time Estimate", filed Jun. 8, 2007.
U.S. Appl. No. 11/811,348, entitled, "Memory Device with Circuitry for Improving Accuracy of a Time Estimate Used in Digital Rights Management (DRM) License Validation", filed Jun. 8, 2007.
Office Action for Chinese Patent Application Serial No. 200880123179, dated Dec. 21, 2011, 13 pages.
Office Action for U.S. Appl. No. 11/811,289, dated Mar. 2, 2012, 25 pages.
Office Action for U.S. Appl. No. 12/542,254, dated Mar. 1, 2012, 23 pages.
International Search Report and Written Opinion for PCT Application Serial No. PCT/US08/065967, dated Nov. 12, 2008, 10 pages.

(56) References Cited

OTHER PUBLICATIONS

Notification of Reasons for Refusal for Japanese Application Serial No. 2010-511336, dated Feb. 28, 2012, 4 pages.
Office Action for U.S. Appl. No. 11/811,284, dated Jul. 3, 2012, 17 pages.
Office Action for U.S. Appl. No. 12/542,254, dated Jul. 10, 2012, 25 pages.
Office Action for Chinese Patent Application Serial No. 008800193473, dated Apr. 28, 2012, 5 pages.
Office Action for Japanese Patent Application Serial No. 2010-511333, dated May 8, 2012, 9 pages.
Office Action for Japanese Patent Application Serial No. 2010-511335, dated May 8, 2012, 6 pages.
Office Action for Taiwanese Patent Application Serial No. 097121272, dated May 11, 2012, 10 pages.
International Search Report and Written Opinion for PCT Application Serial No. PCT/US08/065968, dated Aug. 29, 2008, 12 pages.
International Search Report and Written Opinion for PCT Application Serial No. PCT/US08/065970, dated Aug. 29, 2008, 12 pages.
Notice of Allowance for U.S. Appl. No. 11/811,284 dated Jan. 6, 2014, 12 pages.
Office Action for U.S. Appl. No. 11/811,289 dated Jul. 17, 2013, 50 pages.
Office Action for U.S. Appl. No. 11/811,346 dated Sep. 10, 2013, 17 pages.
Office Action for U.S. Appl. No. 11/811,289, dated Jan. 18, 2011, 22 pages.
Office Action for U.S. Appl. No. 11/811,346, dated Feb. 1, 2011, 25 pages.
Office Action for U.S. Appl. No. 11/811,284, dated Apr. 14, 2011, 15 pages.
Office Action for U.S. Appl. No. 11/811,347, dated Mar. 24, 2011, 32 pages.
Office Action for U.S. Appl. No. 11/811,346, dated Jul. 20, 2011, 25 pages.
Translation of Office Action for Chinese Patent Application Serial No. 200880019347.3, dated May 25, 2011, 5 pages.
Office Action for U.S. Appl. No. 11/811,289, dated Oct. 13, 2011, 23 pages.
Office Action for U.S. Appl. No. 11/811,284, dated Oct. 17, 2011.
Office Action for Chinese Patent Application Serial No. 2008801024434.4, dated Oct. 17, 2011, 13 pages.
Office Action for U.S. Appl. No. 11/811,284, dated Sep. 17, 2009, 47 pages.
Pisello et al., "How to Quantify Downtime", Network World, Jan. 5, 2004, pp. 1-4.
International Search Report and Written Opinion for PCT Application Serial No. PCT/US08/065965, dated Jun. 15, 2009, 14 pages.
Hardware White Paper, "Microsoft Extensible Firmware Initiative FAT32 File System Specification", Version 1.03, Dec. 2000, 34 pages.
Notification for Reasons for Refusal for Japanese Patent Application Serial No. 2010-511333, dated Aug. 21, 2012, 5 pages.
Notification for Reasons for Refusal for Japanese Patent Application Serial No. 2010-511335, dated Aug. 21, 2012, 4 pages.
Office Action for Chinese Patent Application Serial No. 2008801024434 dated Aug. 2, 2012, 18 pages.
Office Action for European Patent Application Serial No. 08 756 738.4 dated Nov. 6, 2013, 6 pages.
Office Action for Chinese Patent Application Serial No. 200880101232 0.0, dated Nov. 3, 2011, 11 pages.
Office Action for U.S. Appl. No. 11/811,289, dated Feb. 21, 2013, 47 pages.
Notice of Allowance for U.S. Appl. No. 12/542,254, dated Mar. 4, 2013, 19 pages.
Office Action for Taiwanese Patent Application Serial No. 097121262, dated Jan. 21, 2013, 6 pages.
Office Action for Taiwanese Patent Application Serial No. 097121269, dated Feb. 4, 2013, 4 pages.
Office Action for Chinese Patent Application Serial No. 2008801023200, dated Apr. 15, 2013, 9 pages.
Office Action for Chinese Patent Application Serial No. 2008801024434, dated Feb. 18, 2013, 4 pages.
Office Action for European Patent Application Serial No. 08 756 739.2, dated Mar. 18, 2013, 4 pages.
Office Action for European Patent Application Serial No. 08 770 229.6, dated Mar. 18, 2013, 7 pages.
Office Action for European Patent Application Serial No. 08 780 764.0, dated Mar. 18, 2013, 7 pages.

\* cited by examiner

METHOD FOR IMPROVING ACCURACY OF A TIME ESTIMATE USED IN DIGITAL RIGHTS MANAGEMENT (DRM) LICENSE VALIDATION

CROSS-REFERENCE TO RELATED APPLICATIONS

This application is related to "Method for Improving Accuracy of a Time Estimate," U.S. patent application Ser. No. 11/811,284; "Memory Device with Circuitry for Improving Accuracy of a Time Estimate," U.S. patent application Ser. No. 11/811,347; "Method for Improving Accuracy of a Time Estimate Used to Authenticate an Entity to a Memory Device," U.S. patent application Ser. No. 11/811,289; "Memory Device with Circuitry for Improving Accuracy of a Time Estimate Used to Authenticate an Entity," U.S. patent application Ser. No. 11/811,344; "Memory Device with Circuitry for Improving Accuracy of a Time Estimate Used in Digital Rights Management (DRM) License Validation," U.S. patent application Ser. No. 11/811,348; "Method for Using Time from a Trusted Host Device," U.S. patent application Ser. No. 11/811,346; and "Memory Device Using Time from a Trust Host Device," U.S. patent application Ser. No. 11/811,345; each of which is being filed herewith and is hereby incorporated by reference.

BACKGROUND

Some memory devices, such as TrustedFlash™ memory devices from SanDisk Corporation, need to know the time in order to perform time-based operations, such as digital rights management (DRM) license validation. Because of the security issues involved in such operations, the memory device may not be able to trust a host device to provide the correct time. While the memory device may be able to obtain the correct time from a trusted component in a network, the host device hosting the memory device may not be connected to the network at the time the memory device needs to know the time. The memory device can be designed to measure its active time, but a time estimate generated from measured active time will not be a true measure of the actual time if the memory device does not continuously measure active time (e.g., if the memory device was powered down after the measurement started). Accordingly, a time estimate generated from the measured active time really only indicates a lower limit of what the actual time could be, and such a time estimate may not provide the accuracy that is desired in certain time-based operations. While a memory device can be equipped with a battery-backed-up clock to continuously keep track of time even when the memory device is inactive, such a clock may add cost to the memory device.

SUMMARY

The present invention is defined by the claims, and nothing in this section should be taken as a limitation on those claims.

By way of introduction, the embodiments described below provide a method for improving accuracy of a time estimate used in digital rights management (DRM) license validation. In one embodiment, a memory device receives a request to validate a DRM license stored on the memory device, wherein the DRM license is associated with a time stamp update policy (TUP) that specifies when a new time stamp is needed. Before attempting to validate the DRM license, the memory device determines if a new time stamp is needed based on the TUP associated with the DRM license. If a new time stamp is needed, the memory device receives the new time stamp and then attempts to validate the DRM license using a time estimate based on the new time stamp. In another embodiment, a memory device receives a request to validate one of a plurality of DRM licenses stored on the memory device, wherein each DRM license is associated with a different TUP that specifies when a new time stamp is needed. Before attempting to validate the one of the plurality of DRM licenses, the memory device determines if a new time stamp is needed based on a TUP associated with the one of the plurality of DRM licenses. If a new time stamp is needed, the memory device receives the new time stamp and then attempts to validate the one of the plurality of DRM licenses using a time estimate based on the new time stamp. Other embodiments are disclosed, and each of the embodiments can be used alone or together in combination.

The embodiments will now be described with reference to the attached drawings.

DETAILED DESCRIPTION OF THE PRESENTLY PREFERRED EMBODIMENTS

Figure 1:
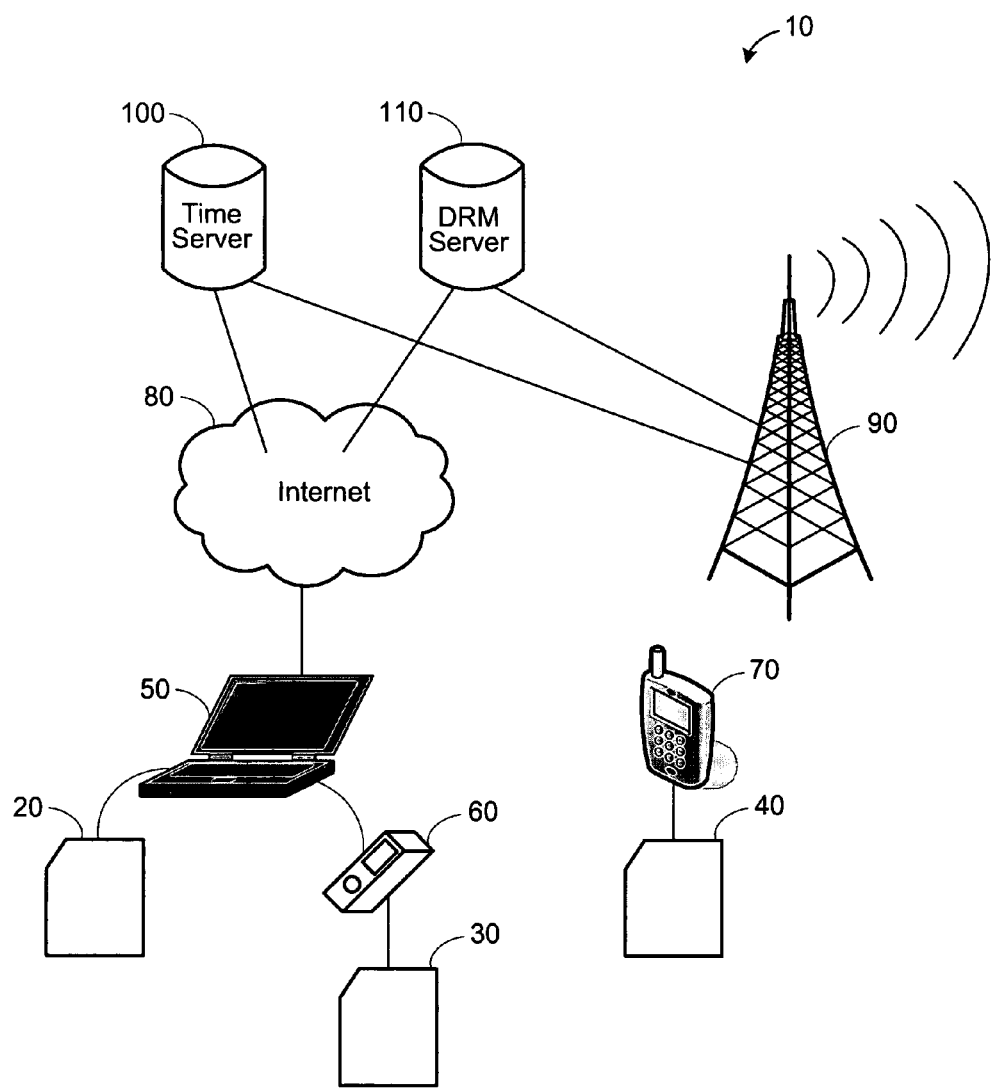
FIG. 1 is an illustration of a system of an embodiment.

Turning now to the drawings, FIG. 1 is an illustration of a system 10 that will be used to illustrate these embodiments. As shown in FIG. 1, the system 10 comprises a plurality of memory devices 20, 30, 40 removably connected with a respective plurality of host devices: a personal computer (PC) 50, a digital media (e.g., MP3) player 60, and cell phone 70. A host device is a device that can read data from and/or write data to a memory device. Data can include, but is not limited to, digital media content, such as an audio file or a video file (with or without audio), an image, a game, a book, a map, a data file, or a software program. Data can be downloaded onto a memory device from a server in a network, pre-loaded by a manufacturer or other third party, or side-loaded from another device, for example.

A host device can take any suitable form and is not limited to the examples shown in FIG. 1. For example, a host device can take the form of a notebook computer, a handheld computer, a handheld email/text message device, a handheld game console, a video player (e.g., a DVD player or a portable video player), an audio and/or video recorder, a digital camera, a set-top box, a display device (e.g., a television), a printer, a car stereo, and a navigation system. Also, a host device can contain mixed functionality. For example, a host device can be a cell phone that, in addition to being able to make and receive telephone calls, is also able to play digital media (e.g., music and/or video) files.

A host device, like the PC 50 and cell phone 70, can have the capability of communicatively connecting to a network (such as the Internet 80 or a wireless network 90, although other types of networks can be used). A host device with such capability will be referred to herein as a "connected device." It should be understood that a "connected device" may not always actually be connected to a network, such as when the cell phone 70 is operating in an unconnected mode or when the PC 50 does not establish an Internet connection. A host device that, by itself, does not have the capability of communicatively connecting to a network (such as the digital media player 60) will be referred to herein as an "unconnected device." An unconnected device can be placed in communication with a network by connecting the unconnected device with a connected device, as shown in FIG. 1, where the digital media player 60 is connected to the PC 50. Even if connected in such a way, an unconnected device may not be able to pull information from the network if the unconnected device is not designed for such functionality (e.g., a simple MP3 player). In such a situation, a component in the network can push information to the device. It should be noted that while FIG. 1 shows the digital media player 60 being connected to the PC 50 via a wired connection, a wireless connection can be used. Similarly, the terms "connected" and "coupled" do not necessarily denote a wired connection or a direct connection.

The network (e.g., the Internet 80 or the wireless network 90) can allow a connected device (or an unconnected device connected to a connected device) to access external components, such as, but not limited to, a time server 100, which can provide a time stamp, and a digital rights management server (DRM) 110, which can provide DRM-protected content and licenses for accessing such content. Both of these servers will be described in more detail below. While the time server 100 and the DRM server 110 are shown as separate devices in FIG. 1, these two servers can be combined into a single device. Further, these servers can contain other functionality. Also, components other than the time server 100 and DRM server 110 can be accessed via the Internet 80 and wireless network 90, if desired.

Figure 2:
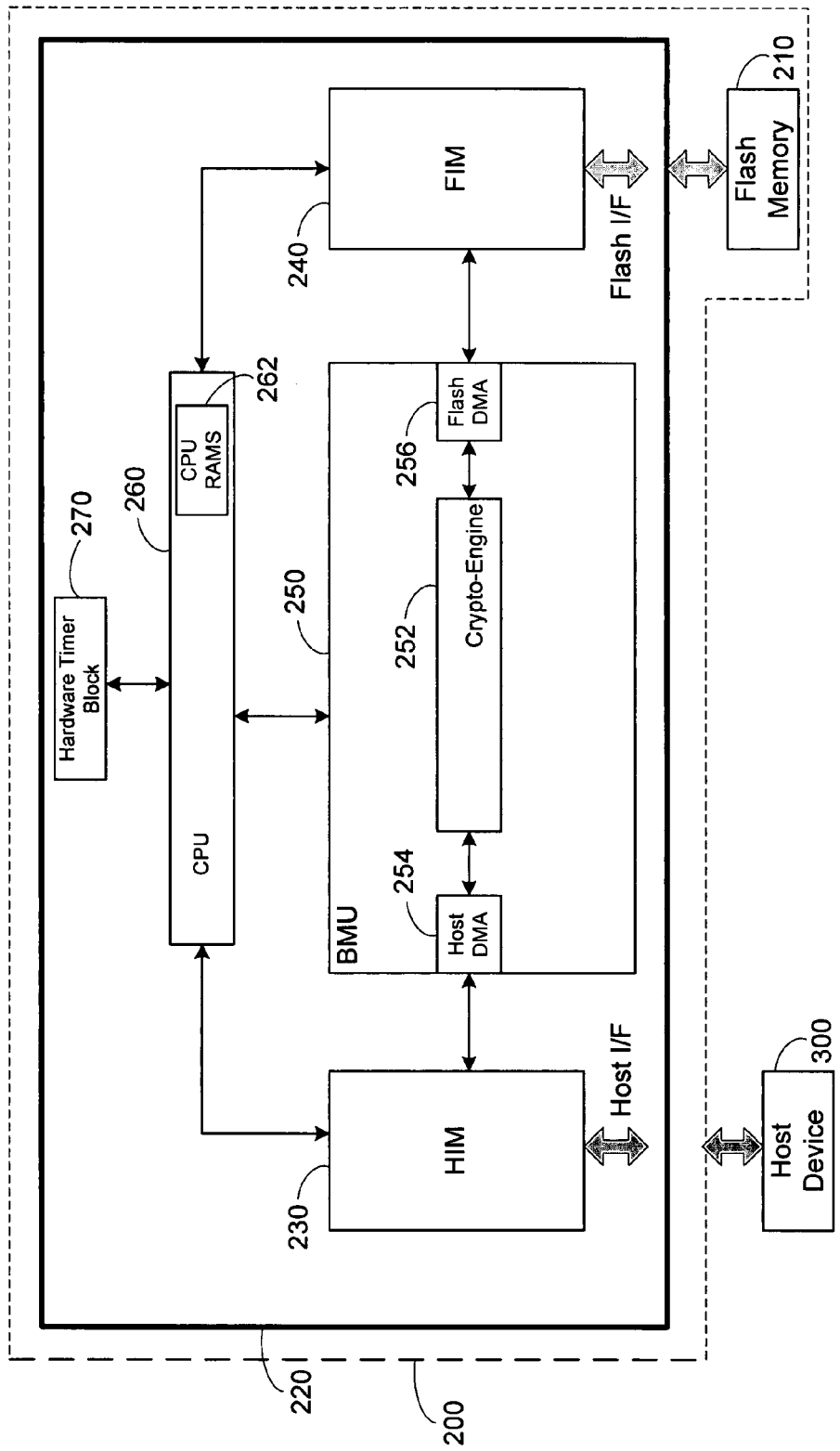
FIG. 2 is a block diagram of a memory device of an embodiment.

Turning again to the drawings, FIG. 2 is a block diagram of a memory device 200 of an embodiment, which can take the form of a memory card or stick. As shown in FIG. 2, the memory device 200 comprises a non-volatile memory array (such as flash memory) 210 and a collection of circuitry 220. In this embodiment, the non-volatile memory array 210 takes the form of a solid-state memory, in particular, flash memory 210. It should be noted that, instead of flash, other types of solid-state memories can be used. It should also be noted that memories other than solid-state memories can be used, such as, but not limited to, magnetic discs and optical CDs. Also, for simplicity, the term "circuitry" will be used herein to refer to a pure hardware implementation and/or a combined hardware/software (or firmware) implementation. Accordingly, "circuitry" can take the form of one or more of an application specific integrated circuit (ASIC), a programmable logic controller, an embedded microcontroller, and a single-board computer, as well as a processor and a computer-readable medium that stores computer-readable program code (e.g., software or firmware) executable by the processor.

The collection of circuitry 210 in FIG. 2 contains a plurality of components: a host interface module (HIM) 230, a flash interface module (FIM) 240, a buffer management unit (BMU) 250, a CPU 260, and a hardware timer block 270. The HIM 230 provides interface functionality for the host device 300, and the FIM 240 provides interface functionality for the flash memory 210. The BMU 250 comprises a crypto-engine 252 for providing encryption/decryption functionality and a host direct memory access (DMA) component 254 and a flash DMA component 256 for communicating with the HIM 230 and FIM 240, respectively. The CPU 260 executes software and firmware stored in the CPU RAMS 260 and/or the flash memory 210. The hardware timer block 270 will be described below in conjunction with the memory device's ability to measure time.

Other components of the memory device 200, such as the electrical and physical connectors for removably connecting the memory device 200 to a host device 300, are not shown in FIG. 2 to simplify the drawing. More information concerning the memory device 200 and its operation can be found in U.S. patent application Ser. Nos. 11/314,411 and 11/557,028, both of which are hereby incorporated by reference. Additional information can be found in U.S. patent application Ser. No. 11/322,812 and U.S. patent application Ser. No. 11/322,766 both of which are hereby incorporated by reference. The components and functionality described in those documents should not be read into the following claims unless explicitly recited therein.

In this embodiment, the memory device 200 stores digital rights management (DRM) keys and licenses to unlock protected content stored on the memory device 200. (It should be noted that these embodiments can also be used with memory devices that do not store DRM keys and licenses to unlock protected content stored on the memory device.) The DRM keys and licenses can be generated by the memory device 200 or generated outside of the memory device 200 (e.g., by the DRM server 110) and sent to the memory device 200. Since the DRM keys and licenses move along with the memory device 200, the protected content is effectively tied to the memory device 200 instead of the host device 300, thereby making the protected content portable and accessible by any host device that can prove to the memory device 200 that it is an authorized device. TrustedFlash™ memory devices from SanDisk Corporation are examples of memory devices that store DRM keys and licenses on the memory device, so that protected content is movable with the memory device. In some embodiments, the memory device 200 also validates a DRM license with the DRM keys stored on the memory device 200, while, in other embodiments, the memory device 200 provides the DRM keys to the host device 300 for it to validate the DRM license with the DRM keys.

Figure 3:
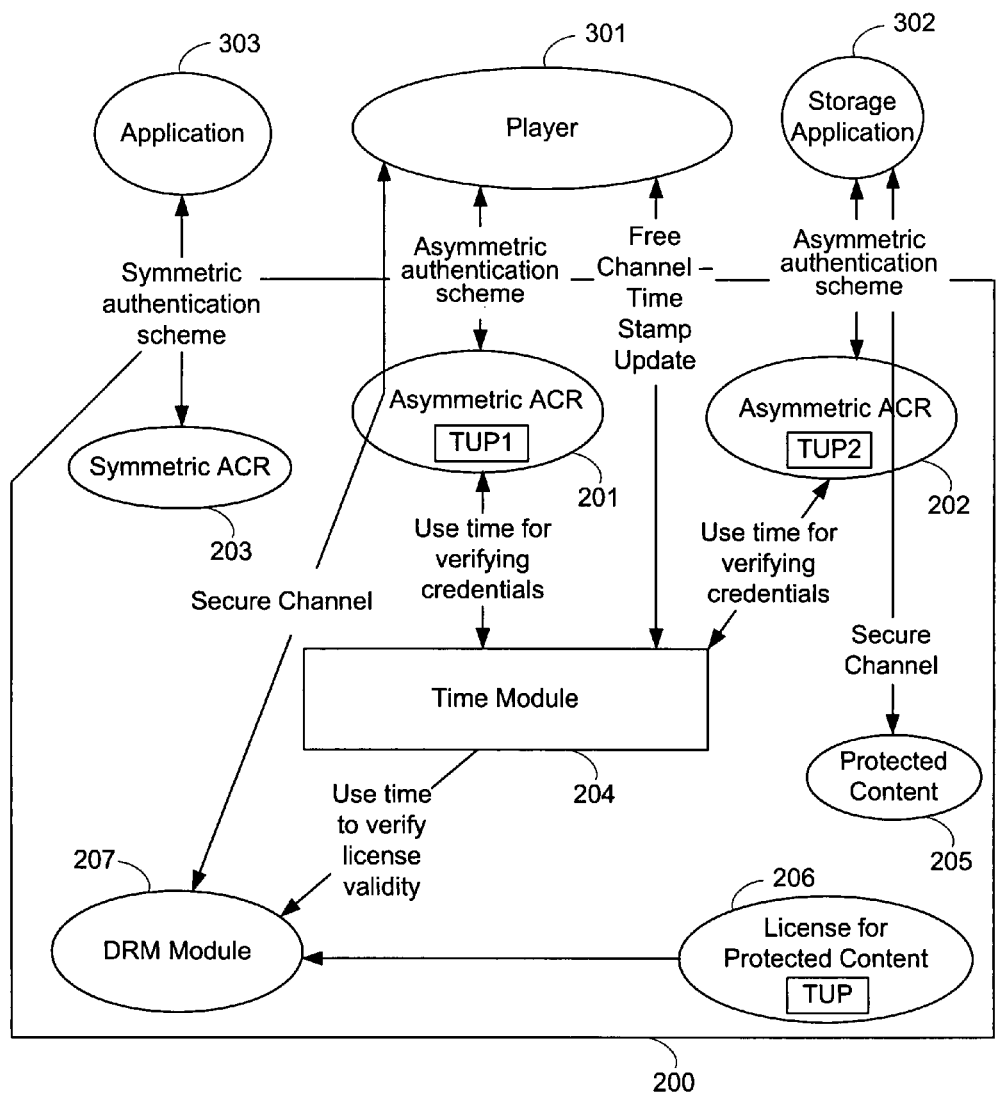
FIG. 3 is an illustration of various functional modules in the memory device of FIG. 2.

In this embodiment, the CPU 260 of the memory device 200 executes a Secure Storage Application (SSA) to ensure that only authenticated entities with proper credentials can access the DRM keys and licenses. The computer-readable code for the SSA can be stored in the flash memory 210, the CPU RAMs 262, or another storage location in the memory device 200. The SSA is described in more detail in the '028 patent application referenced above. FIG. 3 is an illustration of various functional modules in the memory device 200 that will be used to illustrate the operation of the SSA. As shown in FIG. 3, the memory device 200 comprises various access control records ("ACRs"): a first asymmetric ACR 201, a second asymmetric ACR 202, and a symmetric ACR 203. The first and second asymmetric ACRs 201, 202 comprise first and second time update policies (TUP1 and TUP2, respectively), which will be described in more detail below. Although multiple ACRs are shown in FIG. 3, the memory device 200 can contain just a single ACR.

Each ACR 201, 202, and 203 specifies the authentication method to be used and what kind of credentials are needed to provide proof of the entity's identity. Each ACR 201, 202, and 203 also contains permissions to perform various actions, such as accessing the DRM keys and licenses. Once an ACR has successfully authenticated an entity, the SSA system opens a session through which any of the ACR's actions can be executed. As used herein, the term "entity" refers to any person or thing attempting to access the memory device 200. An entity can be, for example, an application running on a host device, the host device itself, or a human user. In FIG. 3, three entities are attempting to access the memory device 200: a media (e.g., audio and/or video) player 301, a storage application 302, and another application 303. These entities 301, 302, 303 can be on the same or different host devices. Each entity 301, 302, 303 is associated with a particular ACR (ACRs 201, 202, and 203, respectively). Additional entities (not shown) can also be associated with one or more of the ACRs 201, 202, and 203.

When an entity initiates a login process, it sends a request for authentication that include an identifier of its associated ACR, which specifies the authentication method to be used and what kind of credentials are needed to provide proof of the entity's identity. In FIG. 3, ACRs 201 and 202 specify an asymmetric authentication method, while ACR 203 specifies a symmetric authentication method. It should be noted that other authentication methods (such as password-based procedures) can be used and that an ACR can also specify that no authentication is required. In addition to specifying a particular authentication method, an ACR can also contain a permissions control record (PCR) that describes the actions an entity can perform once authenticated.

Some authentication mechanisms (such as, for example, one-way and two-way asymmetric authentication using an X.509 certificate chain for authentication) can be time-based, requiring the memory device 200 to know the time in order to verify the credentials presented by the entity. (The symmetric authentication mechanism used by the symmetric ACR 203 does not require the memory device 200 to know the time. In symmetric authentication, a key that is shared by an entity and its associated ACR is used to authenticate the entity.) In asymmetric authentication, time may be needed to evaluate whether credentials, such as an RSA certificate and/or a certificate revocation list (CRL), supplied by an entity are valid. (As used herein, a "certificate" can refer to a single certificate or a plurality of certificates (e.g., a chain of certificate), and a "CRL" can refer to a single CRL or a plurality of CRLs.) Before turning to the mechanisms that the memory device 200 can use to generate a time estimate to perform such validation, a brief discussion of certificates and CRLs will be presented with respect to asymmetric authentication.

Asymmetric authentication uses a public key infrastructure (PKI) system, in which a trusted authority known as a certificate authority (CA) issues RSA certificates for proving the identity of entities. Entities who wish to establish proof of identity register with the CA with adequate evidence for proving their identity. After the identity of the entity has been proven to the CA, the CA issues a certificate to the entity. The certificate typically includes the name of the CA that issued the certificate, the name of the entity to whom the certificate is issued, a public key of the entity, and the public key of the entity signed (typically by encrypting a digest of the public key) by a private key of the CA.

A certificate can contain a data field that holds an expiration date. In such a situation, the entity holding the certificate can only access content protected by an ACR for a limited amount of time (until the certificate expires). A certificate can also contain a data field that holds a future validity time. In this situation, the ACR will not authenticate the entity until the certificate becomes valid. If the memory device 200 determines that the current date is after the expiration date or before the validation date (i.e., if the memory device 200 determines that the certificate is not valid), the memory device 200 will not authenticate the entity presenting the certificate.

Various circumstances (such as, for example, change of name, change of association between the entity and the CA, and compromise or suspected compromise of the private key) may cause a certificate to become invalid prior to its expiration date. Under such circumstances, the CA needs to revoke the certificate. In operation, the CA periodically issues a certificate revocation list (CRL), which is a signed data structure that contains a time-stamped list of revoked certificates. Accordingly, to authenticate an entity, the memory device 200 not only checks to see whether the certificate is timely but also checks the CRL to see whether the certificate is listed on the CRL. (The CRL can be provided by the entity along with the certificate, or the memory device 200 can obtain the CRL itself (e.g., through the Internet 80, if the memory device 200 is a connected device).) If the certificate is listed on the CRL, the certificate is no longer valid (even if it has not expired), and the entity will not be authenticated. Like a certificate, a CRL is issued with an expiration date, which indicates when the CRL should be updated. This ensures that the memory device 200 is using the latest CRL. During authentication, if the memory device 200 finds that the current time is past the CRL's expiration date (i.e., if the memory device 200 determines that the CRL is not valid), the CRL is deemed defective and is preferably not used for certificate verification.

As discussed above, in this embodiment, the memory device 200 needs to know the time in order to verify the credentials (here, a certificate and a CRL). There are several options for allowing a memory device to know what time it is. One option is to have a memory device request, via a host device, a time stamp from a trusted time server every time the memory device needs to know the time. This solution is suitable for connected devices; however, since a memory device can be used in both connected devices as well as unconnected devices (e.g., home PCs that are not connected to the Internet, MP3 players, cell phones that are off the network (e.g., when on an airplane)), the memory device cannot rely on connectivity being available when it needs to know the time for an authentication procedure. Another option is to equip the memory device with a battery-backed-up clock. However, this may be undesired, as it would add cost to the memory device. Yet another option is to rely upon the host device to provide time (from its own internal clock or from an external source) to the memory device. However, in many situations, the memory device cannot trust the host device to provide accurate time. If a user is allowed to "back date" the clock on the host device (i.e., setting the clock on the host device to an earlier time than the current time), the user would be able to circumvent the very time restrictions that the memory device needs to enforce. On the other hand, if the memory device (on an application running in the memory device) can trust the host device, the memory device (or the application running in the memory device) would be able to rely upon the host device for the time. More information when host time can be used is presented below.

Another option, which is used in this embodiment, is to use the limited time tracking capabilities of a memory device; specifically, the memory device's 200 ability to measure its active time. Active time can refer to the amount of time that the memory device 200 was connected to a host device and actually used (i.e., when there is activity on the bus between the memory device 200 and host device 300, as compared to being idle or in a sleep mode). Alternatively, active time can refer to the entire amount of time that the memory device 200 was connected to and received power from the host device 300. The terms "active time" and "usage time" will be used interchangeably herein. As described below, in this embodiment, the memory device 200 is active when the hardware timer block 270 can generate clock ticks as interrupts to the CPU 260, and the CPU 260 can increment the active time counter.

In operation, the hardware timer block 270 (e.g., an ASIC controller) contains an oscillator that generates periodic clock ticks and provides such ticks to the CPU 260 as interrupts. (Preferably, the oscillator operates at a very low frequency and runs while the CPU 260 is asleep.) Accordingly, the hardware timer block 270 interrupts the CPU 260 on a periodic basis (e.g., every millisecond or microsecond). When the CPU 260 gets the interrupt, a special clock interrupt service routine (e.g., in firmware run by the CPU 260) is invoked and adds one period/unit to an active time counter, which is stored in the CPU RAMS 262 and also in the non-volatile, flash memory 210, so the counter value won't be lost if there is a power loss. To avoid excessive wear to the memory 210, it is preferred that the active time counter in the memory 210 be updated periodically (e.g., every minute or so, as long as the memory device 200 is powered on) instead of in response to every clock tick. Although this can lead to additional inaccuracies in the measured time if power loss occurs before the active time counter is updated, this sacrifice might be deemed acceptable in view of the benefits to memory endurance. (To further protect memory endurance, the value stored to the active time counter can include a field indicating how many times the counter has been written to. If the write value exceeds a certain amount, the counter can be stored in another location in memory. The bits within the counter can also be shifted, if that helps endurance.) It is also preferred that writing to the active time counter not affect performance (aside from power consumption to perform the write) and regular activity of the memory device 200. (In other words, it is preferred that writing to the time counter be part of the process of servicing a host command.) For example, the writing to the active time counter can be treated as a background task and performed before servicing a host device command. At the end of the host device command, firmware in the memory device 200 can verify that programming of the active time counter succeeded by reading the data out of the memory and comparing it to the desired value.

Also, it is preferred that the value of the active time counter be stored in the memory 210 securely (e.g., signed via the crypto-engine 252 using a key-hashed message authentication code (HMAC)), so it cannot be easily tampered with. In case of a signature mismatch, the data can be treated as un-initialized, as if an attacker tampered with it. Further, it should be noted that other mechanisms for measuring active time can be used.

To convert the stored value in the active time counter into real time, the CPU 260 multiplies the stored value by the frequency in which the hardware timer block 270 generates clock ticks. For example, if the value 500 were stored in the active time counter and the hardware timer block 270 generates a clock tick every 5 milliseconds, the CPU 260 would calculate an active time of 2,500 milliseconds (500 times 5). To generate a time estimate, the translated active time is added to the last time stamp received by the memory device 200 from a trusted source. In other words, a time stamp acts as a "start line," with the memory device's measured active time being added to the time stamp. A time stamp can take any form and indicate time to any desired degree of precision (e.g., year, month, day, hour, minute, second, etc.). Preferably, the memory device 200 is provided with a time stamp from an entity that the memory device 200 trusts to give it accurate time (e.g., the time server 100 or a trusted host device). A time stamp can take any form and be sent by itself or included in other information. The memory device preferably stores the time stamp securely, via the crypto-engine 252, so it cannot be easily tampered with. When a new time stamp is received by the memory device 200, the new time stamp is stored in the memory device 200, and the active time counter is reset. Thus, active time will thereafter be measured with respect to the new time stamp instead of the old time stamp. Instead of resetting (and, therefore, "rolling back") the counter, the active time counter value that exists at the time of the new time stamp can be recorded and subtracted from the current time in order to measure the active time.

Figure 4:
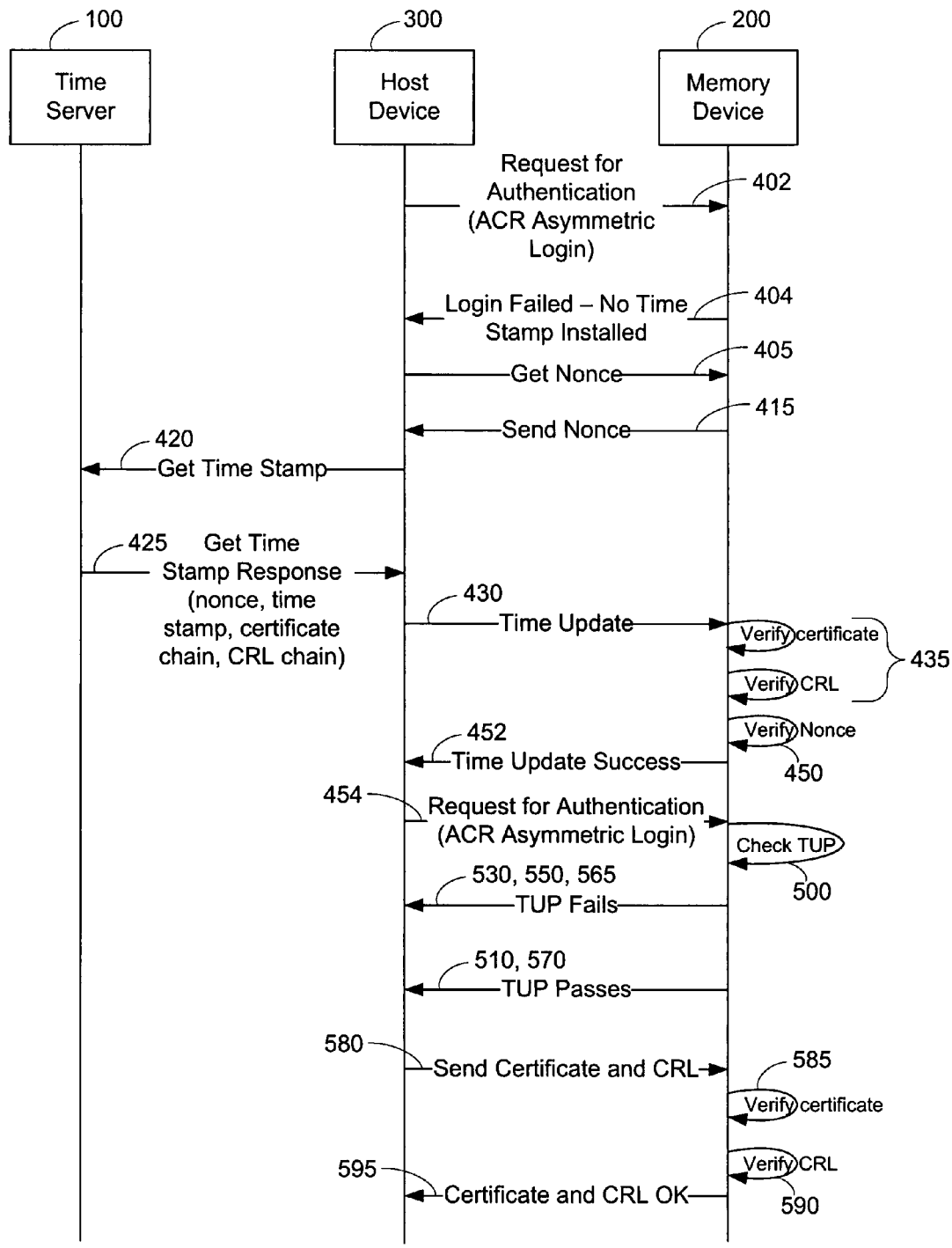
FIG. 4 is a protocol diagram of an asymmetric authentication process of an embodiment.

Now that the memory device's time-tracking capabilities have been discussed, an example of an authentication procedure will be described. Turning again to the drawings, FIG. 4 is a protocol diagram of an asymmetric authentication process of an embodiment. In the following example, the player 301 is attempting to login to the memory device 200 via ACR 201. As described in more detail below, the player 301 contains credentials (e.g., an RSA key pair, certificate, and certificate revocation list (CRL)), and the ACR 201 is responsible for validating the authenticity of the player 301 and granting rights to objects (in this case, establishing a secure channel between the player 301 and the DRM module 207). As shown in FIG. 4, the first step is for the host device 300 to send to the memory device 200 a request for authentication of the player 301 (act 402). If a time stamp has not yet been installed in the memory device 200, the memory device 200 responds to the authentication request with a login failed message (act 404).

The next series of acts describe the process of providing a time stamp to the memory device 200 and will be described in conjunction with FIGS. 5 and 6, which are a system diagram and a flowchart, respectively, that illustrate one particular way in which the memory device 200 can obtain a time stamp. It should be understood that the memory device 200 can obtain a time stamp in a different manner and that the time stamp can take different forms. It should also be understood that a single memory device interfacing with multiple servers or hosts may handle multiple forms simultaneously. Accordingly, the specifics of this example should not be read into the claims unless explicitly recited therein.

Figure 5:
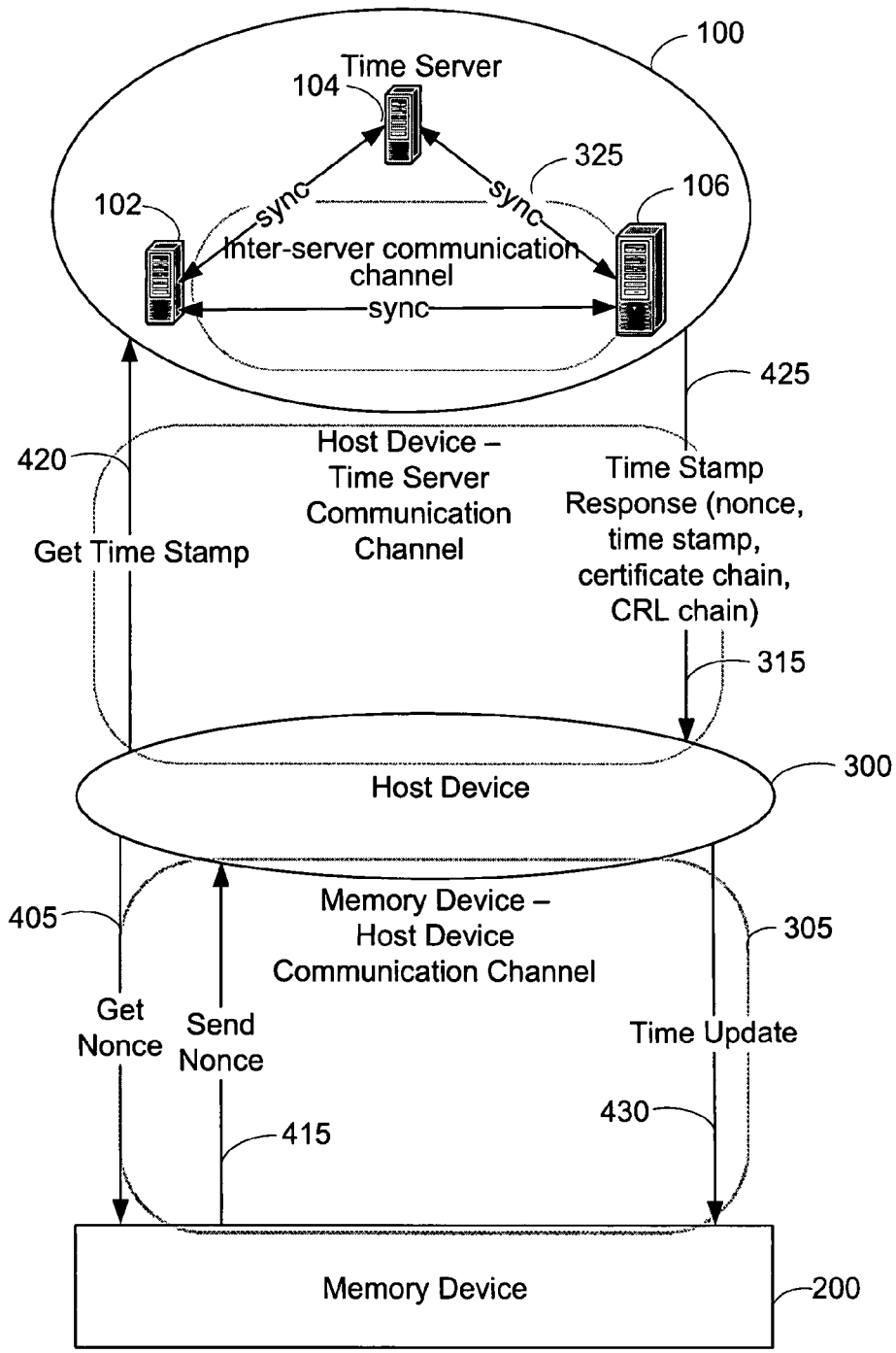
FIG. 5 is a system diagram of an embodiment for obtaining a time stamp.

As shown in FIG. 5, the memory device 200 is in communication with the host device 300 via a memory device—host device communication channel 305, and the host device 300 is in communication with the time server 100 via a host device—time server communication channel 315. Although the time server 100 can comprise a single server, in this embodiment, the time server 100 comprises a plurality of servers 102, 104, 106 synced with each other via an inter-server communication channel 325. Also, as noted above, instead of using the time server 100 for a time stamp, a time stamp from the host device 300 can be used, preferably only if it is a trusted host device.

Figure 6:
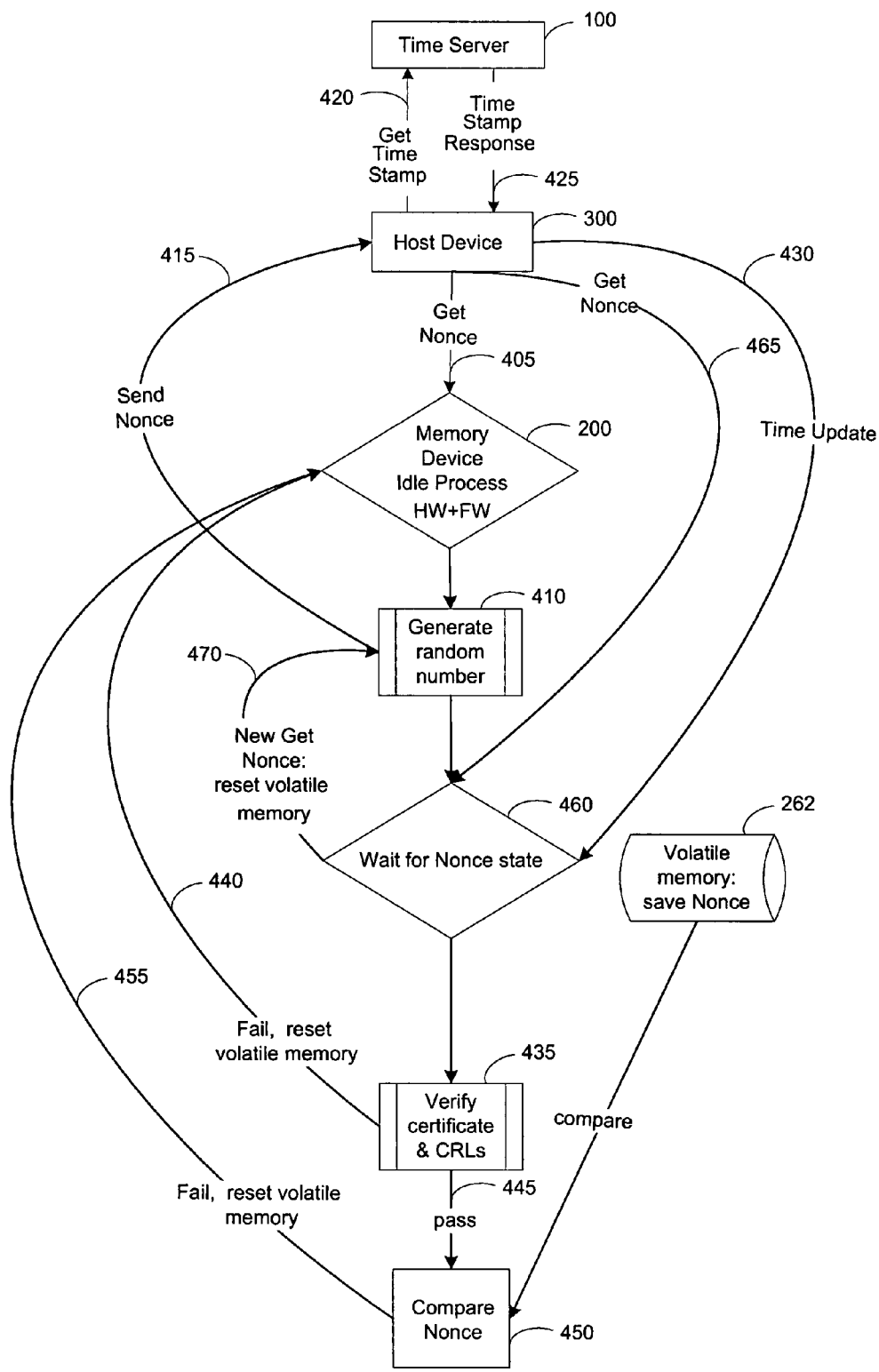
FIG. 6 is a flow chart of a method of an embodiment for obtaining a time stamp.

In this embodiment, the procedure for requesting a time stamp is initiated by the host device 300, which sends a get nonce command to the memory device 200 (act 405) (see FIGS. 4, 5, and 6). In this embodiment, a nonce is a 160-bit random number used by the memory device 200 to later verify the authenticity of the time stamp generated by the time server 100. The memory device 200 generates a random number (nonce) (act 410) and stores it in the CPU RAMS (i.e., volatile memory) 262 (or, alternatively, the memory 210) for a later verification step. The memory device 200 then sends the nonce to the host device 300 (act 415). The memory device 200 also starts to measure time (as described below) to later determine whether a time-out has occurred.

When the host device 300 receives the nonce, it sends a get time stamp request containing the nonce to the time server 100 (act 420). The time server 100 signs the time (e.g., world time in UTC Zulu format) and nonce with its private key. The time server 100 then sends a time stamp response, which, in this embodiment, comprises the nonce, the time stamp, a certificate chain, and a CRL chain, to the host device 300 (act 425). (It should be noted that this certificate and CRL are sent from the time server 100 to authenticate it and are not the same as the certificate and CRL sent to authenticate the player 301.) The host device 300 then sends a time update command with this response to the memory device 200 (act 430). In response to that command, the memory device 200 attempts to verify the certificate and CRLs (act 435). (Again, the certificate and CRL are different from the ones sent to authenticate the player 301.) As discussed below, it may be preferred to assume that the validity period for the time server's 100 certificate and CRL is valid instead of checking their validity against a time estimate generated by the memory device 200. If the verification fails, the memory device 200 resets the volatile memory 262 and returns to an idle process (act 440). If the verification of the certificate and CRL pass (act 445), the memory device 200 compares the nonce in the response with the nonce in the volatile memory 262 (act 450). If the comparison fails, the memory device resets the volatile memory 262 and returns to an idle process (act 455). If the comparison succeeds, the memory device 200 stores the new time stamp in the memory 210, preferably in a secure manner to protect against tampering.

It should be noted that, after the memory device 200 generates the nonce 410 and is waiting for a response (act 460), it is possible that the host device 300 can send the memory device 200 another get nonce command (act 465). As mentioned above, the memory device 200 starts to measure time after the nonce is generated. If the new nonce command (465) is received before the measured time reaches a certain time-out limit, the memory device 200 preferably ignores the new nonce command (465). However, if the new nonce command (465) is received after the time-out limit, the memory device 200 will reset the volatile memory 262 and generate a new nonce (act 470). Accordingly, the nonce is only valid for a limited time, and the time-out limit (the "travel time error") is the maximum time that the memory device 200 considers legitimate to wait for a time stamp from the time server 100.

Because the time stamp stored in the memory device 200 contains the time that the time server 100 signed the data string, the time indicated in the time stamp may not be the actual, real world time that the host device 300 requested the time stamp or the actual, real world time that the memory device 200 stored the time stamp, depending on the degree of precision of the time stamp (e.g., year, month, day, hour, minute, second, etc.) and the delays involved in sending the request and receiving the response. The nonce time-out period discussed above can be set to such a time to ensure that the time stamp will have the degree of precision required by the memory device 200. Accordingly, the memory device 200 has control over the maximum acceptable delay in a time stamp request. Also, in alternate embodiments, the time stamp generated by the time server 100 can indicate some other time, such as an estimated time that the host device 300 requested the time stamp, the expected time the time stamp will be stored in the memory device 200, or some other time.

The above protocol allows the memory device 200 to communicate with the time server 100 over an unsecured connectivity system (e.g., the Internet, a WiFi network, a GSM network, etc.). The connectivity system is unsecured in the sense that the memory device 200 cannot assume that the time stamp sent by the time server 100 will not be tampered with during transmission. Since the network cannot be relied upon to protect the time stamp, the above protection mechanism (or some other protection mechanism) can be used between the time server 100 and the memory device 200. The encryption protocol is such that, if the time stamp is tampered with, the memory device 200 can detect it. In other words, because the connectivity system is not secure, the system itself cannot prevent people from changing the bits in the time stamp; however, the memory device 200 can detect the tampering and reject the time stamp. In an alternate embodiment, a secured communication system is used (i.e., the data communication lines are protected), and the time stamp can simply be sent as plain text since no one can tamper with the time stamp.

Returning to FIG. 4, with the new time stamp now stored in the memory device 200, the memory device 200 sends a "time update success" message back to the host device 300 (act 452), and the host device 300 once again sends a request for authentication to the memory device 200 (act 454). Since the memory device 200 has a time stamp, the memory device 200 will check the time stamp update policy (TUP) of the ACR 201 (act 500). Because a time estimate is based on a time stamp, basing a time estimate on an obsolete time stamp can lead to an inaccurate time estimate. Accordingly, a TUP is used to determine when an existing time stamp on the memory device 200 is considered obsolete and requires renewal (i.e., a new time stamp). As shown in FIG. 3 and as discussed in more detail below, different ACRs can have different TUPs (i.e., different ACRs can have different time tolerance levels), which can be established when an ACR is created.

In this embodiment, the TUP is represented by four values: (1) a threshold number of power cycles, (2) a threshold value of active time, (3) a threshold value of "stretched" active time, and (4) a bit indicating whether or not there is an OR relationship among the parameters (i.e., whether a time update will be required if only a single parameter fails, or whether a time update will be required only if all of the parameters fail). Each of these parameters will be described in detail below. (It should be noted that other parameters in addition to or instead of these can be considered.)

Figure 7:
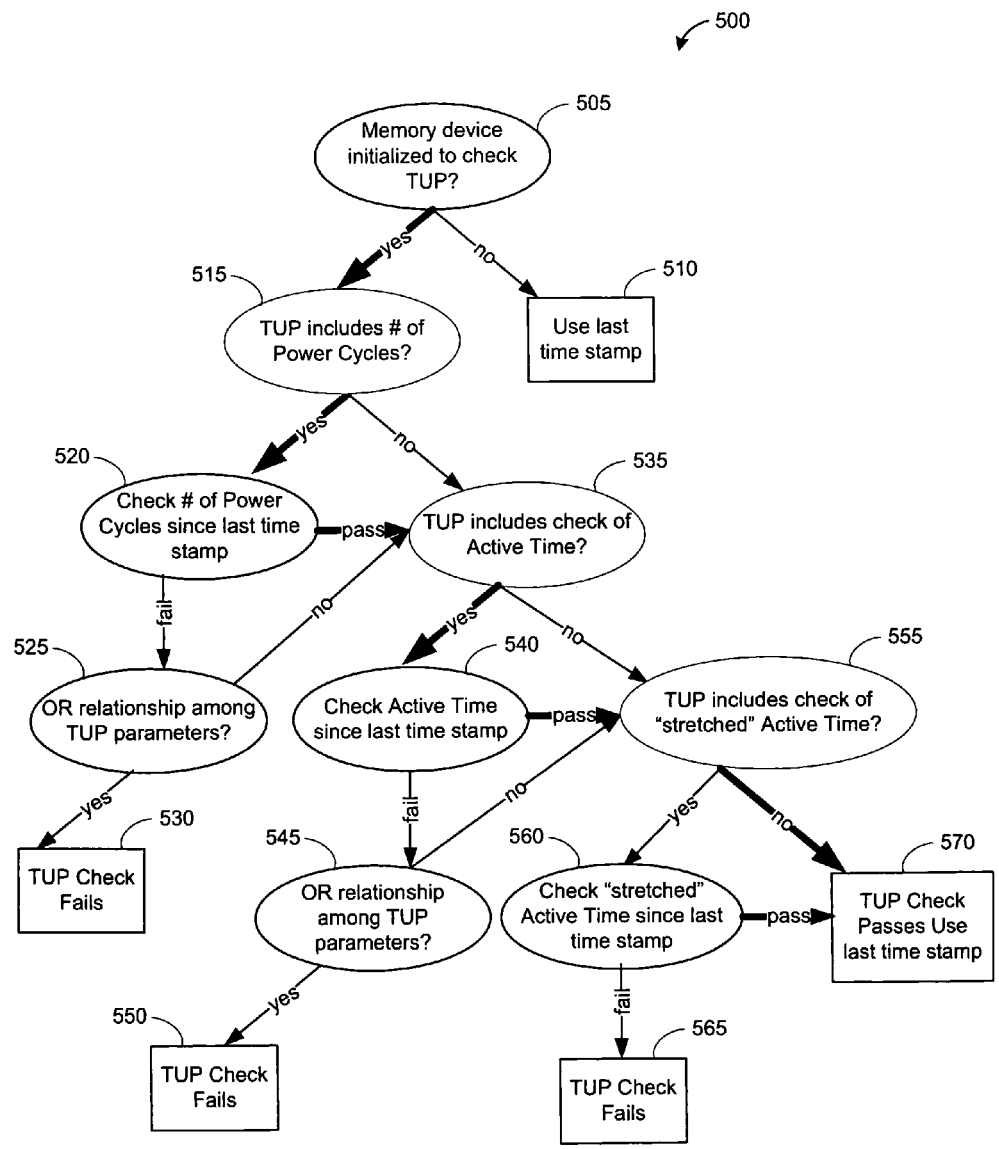
FIG. 7 is a flow chart of a method of an embodiment for checking a time stamp update policy.

FIG. 7 is a flow chart showing more detail of the check TUP act (act 500). First, a check is made to determine whether the memory device 200 has been initialized to check a TUP, e.g., by looking at configuration data stored in the memory 210 (act 505). If the memory device 200 has not been initialized to check a TUP, the memory device 200 uses the last time stamp received by the memory device 200 to generate a time estimate (act 510), and an attempt is made to authenticate the entity using that time estimate. If the memory device 200 has been initialized to check a TUP, the memory device 200 begins that check.

First, the memory device 200 determines if the TUP includes a check of the number of power cycles of the memory device 200 since the last time stamp (act 515). In this embodiment, this is done by checking the "power cycles" value mentioned above. If the "power cycles" value is zero, the number of power cycles is not checked. If the "power cycles" value is other than zero, the number of power cycles is checked using that value as the threshold. The number of power cycles is a count of how many times the memory device 200 was powered up, which indicates how many times the memory device 200 was powered down since the last time stamp (i.e., for every power up, there must have been a power down). The number of power cycles can be measured by the CPU 260. Every time the memory device 200 goes through a power cycle, the CPU 260 can invoke a device reset routine in firmware. As in the situation where the CPU 260 adds one unit to an active time counter, with the device reset routine, the CPU 260 would add one unit to a power cycle counter in the CPU RAMS 262 and/or memory 210. As with the active time counter, the power cycle counter can be updated periodically to reduce memory wear.

When the memory device 200 is powered down, there is at least some actual time that is not represented by the measured active time (because the memory device 200 cannot measure its active time when it is not "active"). Because the memory device 200 does not know how much time passed between power cycles, the number of power cycles does not indicate how inaccurate the measured active time is. However, it does provide a sense of whether the memory device 100 is being used outside of an expected usage pattern, which can roughly indicate how inaccurate the measured active time might be. For example, a time estimate made when the memory device 200 had ten power cycles since the last time stamp may be less accurate than a time estimate made when the memory device 200 had only a single power cycle since the last time stamp.

If the TUP includes a check of the number of power cycles, the memory device 200 checks the number of power cycles of the memory device 200 since the last time stamp to see if the number exceeds the threshold amount set in the "power cycles" value (act 520). The threshold number is configurable per ACR to reflect a desired time tolerance. For example, if the authentication is very sensitive and an assurance is needed that the expiration date of the certificate or CRL has not passed, the threshold number can be set to one. Accordingly, if the memory device 200 were shut down even once (and, hence, there is at least some amount of time that cannot be accounted for by the measured active time), the TUP check of this parameter would fail. If, on the other hand, authentication is not that sensitive, the number of power cycles can be set to a higher number (or not even considered at all) to allow the TUP check to pass even if there were some number of power cycles (and, accordingly, some amount of time that is not accounted for by the measured active time).

If the check of the number of power cycles fails and it is determined that there is an OR relationship among the TUP parameters (act 525), the TUP check fails (act 530). The memory device 200 sends a message to the host device 300 indicating the failure, and the above-described procedure is used to obtain a new time stamp. If the check of the number of power cycles passes, or if it fails and it is determined that there is not an OR relationship among the TUP parameters (act 525), the process continues by determining if the TUP includes a check of active time since the last time stamp (act 535).

Similar to the power cycles procedure described above, if the "active time" value is zero, active time is not checked. However, if the "active time" value is other than zero, the active time is checked using that value as the threshold number of seconds (or some other unit of time). As with the number of power cycles, the threshold active time amount is configurable per ACR to reflect a desired time tolerance. In general, the longer the memory device 200 is active, the more inaccurate the measured active time will likely be. Accordingly, if authentication is very sensitive and an assurance is needed that the expiration date of the certificate or CRL has not passed, the threshold amount of measured active time can be set very low. Conversely, if authentication is not that sensitive, the threshold amount of measured active time can be set higher (or not even considered at all).

If the check of active time fails and it is determined that there is an OR relationship among the TUP parameters (act 545), the TUP check fails (act 550). The memory device 200 sends a message to the host device 300 indicating the failure, and the above-described procedure is used to obtain a new time stamp. If the check of active time passes, or if it fails and it is determined that there is not an OR relationship among the TUP parameters (act 545), the process continues by determining if the TUP includes a check of "stretched" active time (act 555).

As noted above, the measured active time may not be a true measure of the actual active time if the memory device 200 does not continuously measure active time. That is, if the memory device 200 is "inactive" (e.g., when the memory device 200 is idle or in sleep mode, or when the memory device 200 is powered-down or when the memory device 200 is removed from the host device 300—in this embodiment, whatever event causes the hardware timer block 270 to stop generating clock ticks and/or causes the CPU 260 to stop reacting to such ticks), the measured active time will be less than the actual time that passed since the measurement started because there is nothing in the memory device 200 to tell it that time is passing when it is inactive. For example, let's say that a time stamp was received on January $1^{st}$, and the memory device 200 measured an active time of two days. (For simplicity, time is measured in units of days in this example. However, as mentioned above, any desired unit of time can be used.) Accordingly, a time estimate generated by the memory device 200 at this point would indicate that the date is January $3^{rd}$ (i.e., by adding the active time of two days to the last time stamp of January $1^{st}$). If the memory device 200 continuously measured active time, this time estimate would accurately represent the actual time (assuming the hardware timer block 270 and CPU 260 are functioning accurately). However, if the memory device 200 did not continuously measure active time (i.e., if the memory device 200 was inactive at any point after it started measuring the active time), the time estimate would not accurately represent the actual time. At best, the time estimate would indicate that the actual time was at least January $3^{rd}$. The actual time could be January $4^{th}$ or some later time (June $29^{th}$, November $2^{nd}$, December $5^{th}$, the next year, etc.). Accordingly, the check of the active time in act 540 may not give an accurate result.

To address this issue, the TUP can include a check of "stretched" active time (acts 555 and 560). "Stretched" active time is the result of adjusting the measured active time based on a determined accuracy of previously-measured active time. So, if the memory device 200 measures three days of active time and knows that, the last time(s) it measured active time, it produced a value that was 50% of the actual time, the memory device 200 can adjust (or "stretch") the measured active time of three days by a factor of two (because the measured active time was 50% of the actual time) to yield six days. Additional information about "stretching" active time is described in "Method for Improving Accuracy of a Time Estimate from a Memory Device," U.S. patent application Ser. No. 11/811,284, and "Memory Device with Circuitry for Improving Accuracy of a Time Estimate," U.S. patent application Ser. No. 11/811,347, both of which are being filed herewith and are hereby incorporated by reference.

Instead of using "stretched" active time, "stretched" down time can be used. Down time refers to the amount of time that the memory device 200 was inactive between time stamps. Since there is no way of measuring how long the memory device 200 was not active, down time is a calculated number; specifically, down time=actual time between time stamps—active time. "Stretched" down time is the down time calculation adjusted based on a determined accuracy of previously-measured active time (or down time, which is based on measured active time). The following is a list of examples of other down-time variations that can be considered. In this list "DownTime" refers to "stretched" down time (e.g., an average of down times between time stamps of previous knowledge).

Total Downtime estimation (teDownTime): teDownTime= (timestamp$_i$–timestamp$_{i-1}$–ActiveTime$_i$), where the index i is going from the second time stamp to the last time stamp configured in the memory device 200.

Current DownTime (cDowntime) since the last time stamp for a specific moment. This can be calculated relative to the number of Power Cycles (PC) since the last time stamp update (cDowntime=PC since last timestamp*(teDownTime/PC)) or relative to the active time since the last time stamp update (cDowntime=ActiveTime since last timestamp* (teDownTime/ActiveTime))

If the DownTime parameter is configured not be used, the DownTime value is set to 0.

If DownTime parameter is configured to be used, the DownTime is set to 1. The memory device 200 would uses the DownTime property to evaluate when a time stamp update is needed in the following way: when ServiceTime (e.g., a certificate's validity or a CRL's validity)–time estimate<DownTime, a time stamp update is needed.

Returning to FIG. 7, if the check of "stretched" active time fails (act 560), the check of the TUP fails (act 565), and the memory device 200 sends a message to the host device 300. The above-described procedure is then used to obtain a new time stamp. If the check of "stretched" active time passes (or if the memory device 200 is not initialized to check the TUP), the memory device 200 sends a "TUP Passes" message 510, 570 back to the host device 300 (see FIG. 4). The host device 300 then sends the entity's certificate and CRL to the memory device 200, and the memory device attempts to authenticate the entity (act 585). Specifically, the memory device 200 will generate a time estimate based on the last received time stamp and the measured active time to verify the certificate (act 585) and verify the CRL (act 590). If the expiration times of the certificate and the CRL are after the generated time estimate, the memory device 200 sends an OK message back to the host device 300, and other steps, if any, in the authentication method can be performed. If the entity is authenticated, ACR 201 grants the entity rights to objects (here, by establishing a secure channel between the player 301 and the DRM module 207). Otherwise, if the certificate and/or CRL have expired, the memory device 200 can send a message to the host device 300 stating that the authentication attempt has failed. The host device 300 can, in turn, initiate a time stamp update, as described above.

As mentioned above, the time estimate for the authentication attempt is generated by adding the measured active time to the last time stamp. Since the measured active time may be inaccurate, the "time stretching" techniques discussed above can be used to improve the accuracy of the time estimate. However, it is possible that "stretched" active time may actually be greater than the actual time. In the case of checking the TUP, such "over-stretched" active time would result in a new time stamp. However, in the case of verifying a certificate or a CRL, "over-stretched" active time can prevent an otherwise proper entity from being authenticated. Accordingly, it may be desired not to use "time stretching" when generating a time estimate for authentication.

In summary, with the above method, the memory device 200 receives a request to authenticate an entity and, before attempting to authenticate the entity, the memory device 200 determines if a new time stamp is needed. If a new time stamp is needed, the memory device 200 obtains the new time stamp and then attempts to authenticate the entity by generating a time estimate based on the new time stamp and comparing the time estimate to the certificate and/or CRL validity periods. If a new time stamp is not needed, the memory device attempts to authenticate the entity by generating a time estimate based on the last time stamp and comparing the time estimate to the certificate and/or CRL validity periods.

It should be noted that, in this embodiment, the TUP is checked and, if needed, a new time stamp is obtained before the entity is authenticated. In other words, checking the TUP and obtaining a new time stamp does not require the entity to be authenticated before the TUP is checked or before the new time stamp is obtained. This is in contrast to systems that use a single server to provide both a time stamp and a DRM license. Such a server would need to authenticate to the memory device before providing the memory device with a time stamp (or other information). This presents a "Catch 22" situation—to authenticate the server, a fresh time may be needed, but a fresh time stamp can only be obtained after the server has been authenticated. To avoid such a situation, some prior systems simply do not use time in the authentication process. While avoiding the above "Catch 22" situation, ignoring time can lead to authenticating entities who should not be authenticated (e.g., because their certificate and/or CRL has expired).

By separating the time server 100 from the entity attempting to authenticate to the memory device 200, the memory device 200 creates a "free channel" between the player 301 and the memory device's time module 204, allowing the player 301 to deliver a time stamp update from the time server 100 (see FIG. 3). This time stamp would then be used to generate a time estimate against which the entity's credentials can be validated for authentication. A "free channel" refers to a communication pipeline that is established without first authenticating an entity. In contrast, a "secure channel" refers to a communication pipeline that is established only after an entity is authenticated.

It should be noted that although the player 301 does not need to be authenticated in order for it to be used as a conduit to supply the memory device 200 with a time stamp from the time server 100, the time server 100 is preferably authenticated to ensure that the time stamp is coming from a trusted source. This is shown in act 435 in FIGS. 4 and 6, where the time server's 100 certificate and CRL are verified before accepting its time stamp. However, to avoid the "Catch 22" situation discussed above, the memory device 200 preferably assumes that the validity period for the time server's 100 certificate and CRL is valid and, accordingly, does not verify the validity periods against a generated time estimate.

When an entity is authenticated to the memory device 200, it can perform various actions set forth in the ACR's permissions control record (PCR). For example, with reference again to FIG. 3, the player 301 can communicate with a DRM module 207 via a secure channel to attempt to access protected content 205 in the memory device 200. (As another example, the ACR for the storage application 302 allows that application 302 to store protected content 205 in the memory device 200.) Even though the player 301 has been authenticated, since the content is protected, the DRM module 207 would attempt to validate the DRM license 206 for the protected content 205 (e.g., by determining if the license is still valid or if it has expired) before unlocking the protected content. To do this, the DRM module 207 would request a time estimate from the time module 204 in the memory device 204. (The time module 204 refers to the software and/or hardware described above that is used to store and generate the various components used to generate a time estimate (e.g., time stamp, active time, number of power cycles, "stretch" factor, etc.).) The DRM module 207 compares the generated time estimate to the expiration date and/or validity period in the license 206 to determine whether or not the license is valid. The DRM module 207 can perform additional checks to validate the license, such as, but not limited to, determining whether the protected content 205 has been played more than a specified number of times.

As mentioned above, the more recent the time stamp, the more accurate the time estimate will likely be. In the above embodiment, a TUP in an ACR determines if a time stamp update is needed. Accordingly, the TUP effectively determines how accurate a generated time estimate will be for DRM license validation. In determining the parameters of the TUP, one needs to strike a balance between the needs of service providers, who are providing services with expiration considerations, and the needs of the end users, who may be inconvenienced when they need to connect their host devices to a network in order to get a fresh time stamp. If the time tolerance were too loose, the service provider may loose revenue. On the other hand, if the time tolerance were too strict, the end user may decide to drop the service if frequent connections to a network to obtain a required time stamp update are too burdensome.

When the memory device 200 has a single ACR with a single TUP (or multiple ACRs all sharing the same TUP), the single "one size fits all" TUP may not strike the right balance for all service providers. Accordingly, in this embodiment, the memory device 200 has a plurality of ACRs 201, 202, each with a different TUP (TUP1, TUP2) that is configurable by its associated service provider. As discussed above, through the use of different ACRs, the memory device 200 can be configured to authenticate using different authentication schemes (symmetric, asymmetric authentication, etc). The use of different ACRs also allows for configurable time tolerances. That is, through the use of configurable TUPs in the ACRs, service providers can define their own time tolerance by specifying when one or more of the memory device's time-telling parameters (e.g., active time, number of power cycles, "stretched" active time/down time) is considered obsolete and should trigger a time stamp update. By making TUPs configurable, a service provider can configure its time tolerance according to its specific needs and its relationship with end users, instead of relying upon a single "one size fits all" TUP.

For example, some service providers issue certificates for a very short time (e.g., ten minutes). By forcing the end user to get a new certificate every time he wants to use the service on the memory device 200, the service provider can closely monitor an end user's behavior and assess a fee every time the end user requests a certificate. So, for this business model, the service provider needs a tight tolerances for monetization. As another example, if the service provider has a very fluid install base of end users, the service provider may desire to frequently revoke certificates as a major part of its business model. In this situation, the service provider would also want a tight time tolerance to make sure the most-up-to-date CRL is being used for authentication. On the other hand, if the service provider is providing a monthly subscription service in which users would regularly connect to the service provider's web site to get new content and receive a forced time stamp update, the service provider would not need as tight of a time tolerance because the end user will likely connect to the network to get new content.

Instead of or in addition to using configurable TUPs on ACRs, a configurable TUP can be placed on DRM licenses for individual pieces of content. In this way, instead of an authenticated entity treating all pieces of content equally, the entity can be forced to obtain a new time stamp for some content while using an existing time stamp for other content. (Unlike the TUP on an ACR which is only checked during authentication, a TUP on a license can be checked every time the DRM module 207 is attempting to validate the license.)

Consider, for example, the situation in which a user downloads a two-hour movie to his memory device along with a license that says that the movie can only be viewed for 24 hours. While the service provider may not want a user to watch the movie after the 24 hour period, he may also not want to inconvenience a normal user by making him connect to the network to obtain a new time stamp. Accordingly, the service provider may decide to place a TUP on the license that requires a new time stamp if the active time is more than four hours (the amount of active time required to watch the two-hour movie two times). If the active time is greater than four hours when the DRM module 207 attempts to validate the license, the user will not be able to watch the movie—not necessarily because the license expired, but because a new time stamp is needed. (Instead of or in addition to active time, the number of power cycles can be used in the TUP. For example, based on an average usage pattern, ten or more power cycles may indicate that the memory device was used more than 24 hours.) If the time estimate generated with the new time stamp indicates that the license if valid, the DRM module 207 will allow the movie to be played again.

By allowing the TUP to be configurable per license, a TUP can be tailored to the content. Accordingly, if, instead of the movie expiring after 24 hours, the movie expired after one week, the time tolerance on the license can be set differently. For example, if the service provider estimates that the memory device is used, on average, 10 hours per day, the service provider can set the TUP in the license to trigger a time update after 70 hours of active time (i.e., 10 hours-per-day times 7 days). As another example, if instead of a two-hour movie, the content was a three-minute pay-per-view video that should only be watched once, the TUP can be designed such that a new time stamp would be required after three-minutes of active time.

The service provider's business model can also be a consideration in designing the TUP. For example, currently, a monthly subscription service is a popular business model for distributing rights to protected music. In a music subscription service, a user downloads as much music as he wants from the service provider's web site and is allowed to play that music as many times as he wants for one month. After that month, the user will need to renew his subscription to renew the license; otherwise, the license will expire, and the user will no longer be able to play the music stored on his memory device. Users who frequently visit the service provider's web site for more songs will receive a new time stamp when they connect to the web site; hence, their memory devices will be able to provide a more accurate time estimate. However, users who download a relatively large amount of music may not necessarily reconnect to the service provider's web site before the monthly license expires. When the user eventually reconnects for more music, the service provider can charge the user for the time he was allowed to play the music outside of the license terms. Because of this, as a business model, a service provider of a monthly subscription may want a very different time tolerance than a service provider of pay-per-use content, where a user may not go back to the web site where he received the pay-per-use content. In this situation, because a user is likely to come back for more music in a monthly subscription service than in a pay-per-use service, the service provider may not want a strict time tolerance because it may upset a customer by requiring him to obtain a new time stamp, even though he would otherwise have eventually returned to the web site. Having a less-strict time tolerance may mean that customers who never return to the service provider's web site will be able to play music for longer than the one-month term of the license (e.g., for one-month of active time instead of one-month of actual time). However, on balance, the service provider may decide that such unauthorized use is an acceptable sacrifice to make in order to avoid inconveniencing and upsetting returning customers.

As another example, consider a business model in which a service provider wants to provide point advertising to a cell phone when a user is using his cell phone to play audio or video content from a memory device. If the point advertising contains ads related to stores that are near the location of the cell phone at the time the content is being played, the host device needs to be connected to the network when the content is being played; otherwise, the location-specific point advertisement cannot be delivered. To ensure this happens, the TUP of the content can be set to a very low amount (e.g., one minute of active time) to ensure that the user will connect to the network to get a new time stamp. Once the user connects to the network, the network will know the cell phone's location and will be able to push the appropriate ad content to the cell phone. On the other hand, if the service provider makes money just by knowing how many times the content was played, the time tolerance can be much less strict.

As shown by the above examples, through the use of configurable TUPs on license files, the service provider of the particular content can strike whatever time update balance he deems appropriate so as to not upset his customers by requiring them to connect their host devices to the network for a time stamp update. It should be noted that, because the memory device in this embodiment is a multi-purpose, multi-application memory device with multiple TUPs, one service on the memory device can shut down after a certain time, while other services on the memory device are still enabled. That is, a player, even though authenticated, may be able to play certain content on the memory device but may be prevented from playing other content on the memory device unless a new time stamp is obtained because of the different TUPs associated with the licenses of the different content.

As illustrated above, in these embodiments, the memory device comprises two separate components: a central security system and one or more applications separate from the central security system. (Because an application is separate from the central security system, an application will sometimes be referred to herein as an "extension" or an "internal extension"). In the embodiment shown in FIG. 3, the application takes the form of a DRM module 207. However, other applications can be used, such as those that provide, for example, e-commerce, banking, credit card, electronic money, biometric, access control, personal data, or secured email functionality. It should also be noted that while only a single application is shown in the memory device 200 in FIG. 3, a memory device can have several applications (e.g., a DRM module and an e-commerce module).

The central security system, through the use of ACRs, authenticates an entity attempting to access protected pieces of data stored in the memory device via applications inside the memory device (e.g., a DRM agent). Once an entity authenticates to the memory device, a secured session is opened between the entity and the application specified by the ACR used to authenticate the entity. The entity can then send commands/requests to the associated application to access the protected data. In this way, the central security system acts as the main gatekeeper to the memory device. As described in more detail in the Ser. No. 11/557,028 patent application referenced above, the central security system can also isolate various applications running on the memory device 200 so that one application does not have access to data associated with a different application.

While the central security system provides an access control mechanism and protects data stored in the memory device so that the data is accessed only by the appropriate authorized entities, the central security system itself may not be able to understand and process the very data it is protecting. It is the applications running on the memory device that can understand and process the protected data. For example, if the protected data is a DRM license, a DRM agent—not the central security system—would be able to validate the license. Accordingly, the central security system can be considered to be a configurable, application-independent toolbox. In operation, a service provider places an application on the memory device and defines an ACR that associates a particular entity with the application. From the central security system's point of view, it does not know what the application does (e.g., whether the application provides DRM license validation, e-commerce functionality, etc.) but does know that only entities authenticated to that particular ACR are allowed to communicate with the application defined in that ACR. Once an entity has been authenticated by the central security system, the central security system opens a secure channel between the entity and the application.

In some situations, both the central security system and the application need to know the time. For example, the central security system may need to know the time for time-based authentication (e.g., asymmetric authentication), and the application may need to know the time for time-based operations (e.g., DRM license validation). As mentioned above, the memory device has a central time module that can provide time to both the central security system and applications running on the memory device. For example, with reference to FIG. 3, the time module 204 can provide time to asymmetric ACRs 201, 202 to authenticate various entities, as well as to the DRM module 207 to verify license validity. As will be described below and in conjunction with FIG. 8, in some situations, an application on a memory device can choose to use host time in addition to or instead of time from the memory device's time module.

Figure 8:
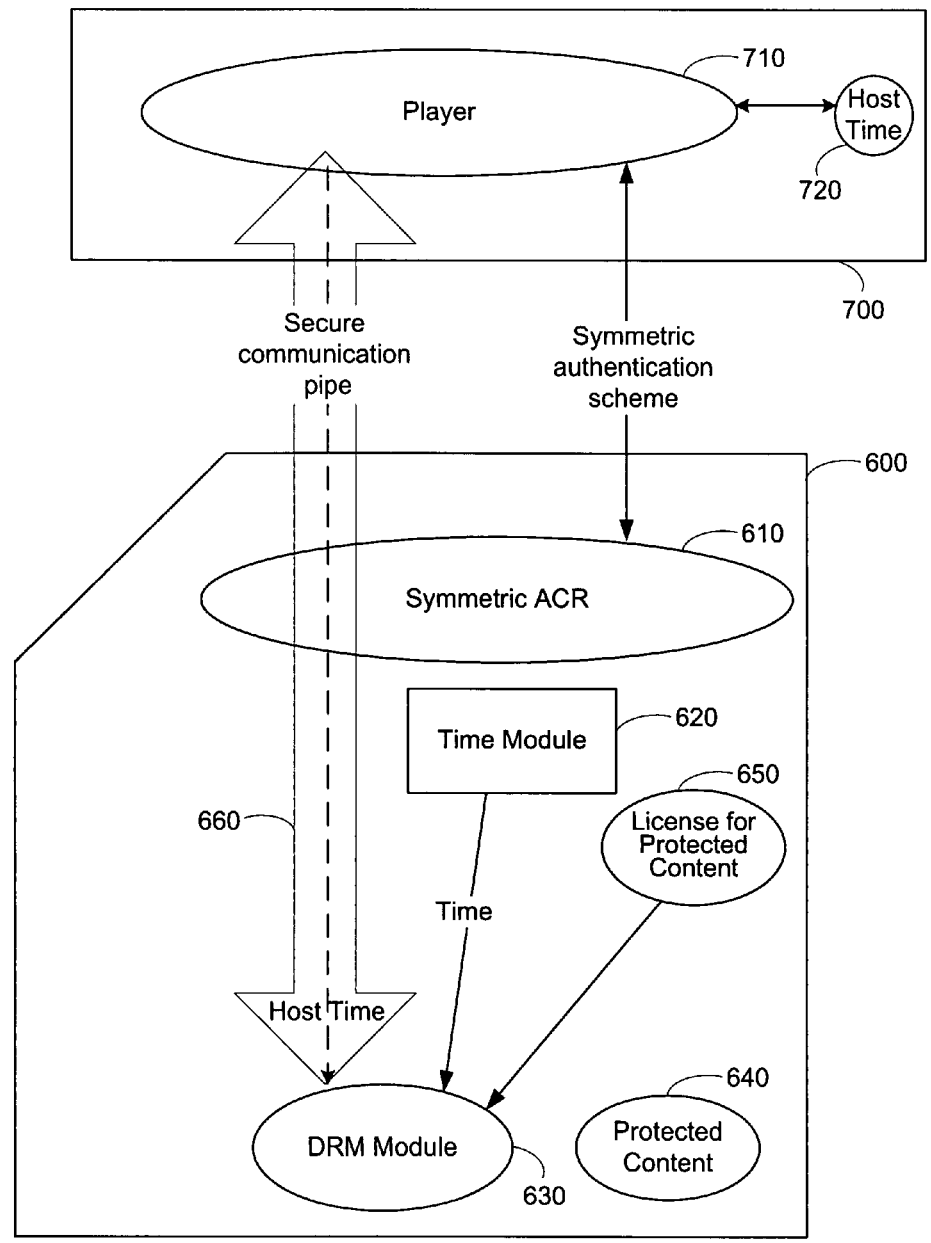
FIG. 8 is an illustration of a memory device of an embodiment that uses host time for an application running in the memory device.

FIG. 8 shows a memory device 600 in communication with a host device 700. The host device 700 comprises an entity (here, a player 710) and has some mechanism for providing time 720 (e.g., a battery backed-up clock). In this example, the memory device 600 has a symmetric ACR 610 (although an asymmetric ACR can be used), a time module 620, a DRM module 630, protected content 640, and a license 650 for the protected content 640. (In FIG. 8, the application in the memory device is a DRM module 630. It should be noted that other types of applications can be used, and more than one application can be running in the memory device.) When the player 710 authenticates to the memory device 600 using the symmetric ACR 610, a secure channel 660 is established between the player 710 and the DRM module 630, in accordance with parameters established in the symmetric ACR 610. The DRM module 630 and the player 710 are not unfamiliar with each another, as a service provider defined the symmetric ACR 610 to associate the DRM module 630 with the player 710. Accordingly, there is a certain level of trust between the DRM module 630 and the player 710 since they are counterpart members of the same group. Based on this trust, the DRM module 630 can be programmed to accept host time 720 from the player 710 as a source of time to perform DRM license validation. So, the DRM module 630 has two independent sources of time with which it can perform DRM license validation: the host time 720 and the time from the memory device's central time module 620. There are advantages and disadvantages associated with each of these sources of time. Because the memory device's time module 620 does not continuously keep track of time, time from the time module 620 may not be as accurate at the host time 720, which is probably provided by a battery-backed-up continuous clock. On the other hand, due to all of the security precautions discussed above, time from the time module 620 may be more secure than the host time 720, especially if a user of the host device 700 is able to alter the host time 720 using a simple user interface.

An application running on the memory device 600 (such as the DRM module 630) can be programmed to use these two different time sources in any way desired to generate a time estimate for its time-based operation. (However, it is preferred that the application not be able to update the time module 620 using the host time 720.) For example, the application can be programmed to always use the host time 720 instead of the time from the time module 620 or always use the time from the time module 620 instead of the host time 720. As another example, the application can be programmed to use the later (or earlier) of the host time 720 and the time from the time module 620. The application can also be programmed to generate a time estimate using both time sources in some fashion (e.g., taking an average of the host time 720 and the time from the time module 620, etc.). As yet another example, the application can determine which time source to use based on information about the host device 700. The application can learn of the type of host device through the authentication process (e.g., if asymmetric authentication is used, the authentication algorithm can inform the application of the individual and group identities associated with the host device 700). This information can be important because some host devices may be more secure than others. For example, if the host device is a PC, its clock can be easily manipulated via a simple user interface on a software application. (In addition to not trusting the host time from a relatively untrustworthy host device, the application may not trust an entity running on such a host device with content keys, the license values or terms, or the right to change the license, for example. In such a situation, the DRM agent may just stream the content out of the memory device to the host device (instead of giving the encryption keys and content to the host device).) However, if the host is a closed system, such as an MP3 player, the host's clock may be much more difficult to manipulate. Accordingly, an application running on the host device 600 may trust the host time 720 more when the host device 700 is an MP3 player than when the host device 700 is a PC.

In one embodiment, the player 710 pushes the host time 720 to the DRM module 630 when it sends a request to the DRM module 630 to play a song. The DRM module 630 then decides whether to use the host time 720 or the time from the time module 620, as described above. Preferably, the host time 720 will only be used for a particular log-in session, which would be a relatively short interval, instead of being used as an absolute current time measurement for later sessions. Alternatively, the host time 720 can be stored for future use by the application, with "time-stretching" and the other mechanisms discussed above being (optionally) used to improve the accuracy of that time. However, it is preferred that the host time be used only for an application's particular time-based operation and not be used to update the time in the time module 620 (since an application is an "extension" and not part of the same trust camp as the central security system). Preferably, time in the time module 620 is only updated using trusted time servers (which are a part of the same trust camp as the central security system), as described above. It should also be noted that when several applications are running on the memory device 600, each application can have two sources of time: time from the time module 620 and time from the host device operating the entity communicating with the application. However, it may be preferred to allow host time associated with one application to only be used with that application and not with other applications associated with different host devices.

As discussed above, an application running on the memory device 600 (such as the DRM module 630) can be programmed to compare the host time 720 with the time from the time module 620 and use the later (or earlier) of the two times. The host time 720 can be earlier than the time from the time module 620 because the host 700 fails to connect to its time server for a sufficiently long time that a time skew occurs in the host time 720 or because the host clock was hacked, for example. As also discussed above, the host time 720 can be stored for future use by the application. Combining these ideas, the host time 720 can be stored and later used (either alone or with the time from the time module 620) for comparison with time received from a different host device. Based on the comparison, the memory device can decide whether to use the time from a current host device or stored time from a previous host device to perform a time-based operation. For example, the memory device can be programmed to take the earlier of the two times if the time-based operation is a "no earlier than" operation and the later of the two times if the time-based operation times is a "no later than" operation. In this way, time stamps received from other trusted host devices can be used as a reference for a single multi-host anti-rollback mechanism relative to a single time server.

As also discussed above, a non-time-based authentication system (such as symmetric authentication) can be used to authenticate a host device. This allows an application's time-based operation (e.g., a DMR operation) to be independent from the authentication time server. That is, since only the time from the host device or DRM server is used, the application's time-based operation does not depend on time from the authentication time server or the memory device's time module. Accordingly, if, for whatever reason, there is a problem with the authentication time server or if the time-based application chooses not to use time based on the authentication time server, the time-based application can still perform its operation using the host time.

It should be noted that any of the above embodiments can be used alone or together in combination. Other embodiments that can be used with these embodiments are described in the patent applications incorporated by reference. Further, while it is presently preferred that these embodiments be implemented in a TrustedFlash™ memory device by SanDisk Corporation, it should be understood that these embodiments can be used in any type of memory device. Also, these embodiments can be used in non-memory device fields where one encounters the general problem of having an inaccurate clock and needing to know or use the time. Additionally, some or all of the acts described above can be performed on a host device (or some other device) instead of exclusively on the memory device.

It is intended that the foregoing detailed description be understood as an illustration of selected forms that the invention can take and not as a definition of the invention. It is only the following claims, including all equivalents, that are intended to define the scope of this invention. It should be noted that the acts recited in the claims can be performed in any order—not necessarily in the order in which they are recited. Finally, it should be noted that any aspect of any of the preferred embodiments described herein can be used alone or in combination with one another.

What is claimed is:

1. A method for validating a digital rights management (DRM) license, the method comprising:
    performing the following in a processor of a memory device:
        receiving a request to validate a digital rights management (DRM) license stored on the memory device;
        in response to receiving the request to validate the DRM license but before attempting to validate the DRM license, determining if a new time stamp is needed based on a time stamp update policy (TUP) for the DRM license that specifies when a new time stamp is needed; and
        based on a determination that a new time stamp is needed, receiving the new time stamp and then attempting to validate the DRM license using a time estimate based on the new time stamp.

2. The method of claim 1, wherein the TUP comprises one or more of the following parameters: a number of power cycles of the memory device since a last time stamp received by the memory device, active time of the memory device since the last time stamp, and stretched active time of the memory device since the last time stamp.

3. The method of claim 1 further comprising:
    with the memory device:
        receiving a request to validate a second DRM license stored on the memory device;
        before attempting to validate the second DRM license, determining if a new time stamp is needed based on a second TUP; and
        based on a determination that a new time stamp is needed, receiving the new time stamp and then attempting to validate the second DRM license using a time estimate based on the new time stamp.

4. The method of claim 1, wherein the new time stamp is generated by a time server.

5. The method of claim 1, wherein the new time stamp is generated by a host device connected with the memory device.

6. The method of claim 1, wherein the memory device stores digital rights management (DRM) keys and licenses to unlock protected content stored on the memory device.

7. The method of claim 1 further comprising:
    performing the following in the memory device prior to receiving the request to validate the DRM license:
        receiving a request to authenticate an entity;
        before attempting to authenticate the entity, determining if a new time stamp is needed based on a second TUP; and
        based on a determination that a new time stamp is needed, receiving the new time stamp and then attempting to authenticate the entity using a time estimate based on the new time stamp.

8. The method of claim 1 further comprising:
    based on a determination that a new time stamp is not needed, attempting to validate the DRM license using a time estimate based on a last time stamp received by the memory device, wherein the time estimate based on the last time stamp received is generated by:
        measuring active time of the memory device with respect to the last time stamp received using a time counter in the memory device, wherein the time counter runs only when the memory device is active;
        determining accuracy of active time previously measured by the memory device over a time period by comparing it with actual time over that time period, wherein inaccuracy is due at least in part to down time of the memory device;
        adjusting the measured active time based on the determined accuracy; and
        adding the adjusted measured active time to the last time stamp received.

9. A method for validating a digital rights management (DRM) license, the method comprising:
    performing the following in a processor of a memory device:
        receiving a request to validate one of a plurality of digital rights management (DRM) licenses stored on the memory device;
        in response to receiving the request to validate the one of the plurality of DRM licenses but before attempting to validate the one of the plurality of DRM licenses, determining if a new time stamp is needed based on a time stamp update policy (TUP) for the DRM license that specifies when a new time stamp is needed; and
        based on a determination that a new time stamp is needed, receiving the new time stamp and then attempting to validate the one of the plurality of DRM licenses using a time estimate based on the new time stamp.

10. The method of claim 9 further comprising:
    with the memory device:
        if the new time stamp is not needed, attempting to validate the one of the plurality of DRM licenses using a time estimate based on a last time stamp received by the memory device.

11. The method of claim 9, wherein the TUP comprises one or more of the following parameters: a number of power cycles of the memory device since a last time stamp received by the memory device, active time of the memory device since the last time stamp, and stretched active time of the memory device since the last time stamp.

12. The method of claim 9, wherein the new time stamp is generated by a time server.

13. The method of claim 9, wherein the new time stamp is generated by a host device connected with the memory device.

14. The method of claim 9, wherein the memory device stores digital rights management (DRM) keys and licenses to unlock protected content stored on the memory device.

15. The method of claim 9 further comprising:
    with the memory device, prior to receiving the request to validate the one of the plurality of DRM licenses:
        receiving a request to authenticate an entity;
        before attempting to authenticate the entity, determining if a new time stamp is needed based on a second TUP; and
        based on a determination that a new time stamp is needed, receiving the new time stamp and then attempting to authenticate the entity using a time estimate based on the new time stamp.

16. The method of claim 9 further comprising:
    based on a determination that a new time stamp is not needed, attempting to validate the one of the plurality of DRM licenses using a time estimate based on a last time stamp received by the memory device, wherein the time estimate based on the last time stamp received is generated by:

measuring active time of the memory device with respect to the last time stamp received using a time counter in the memory device, wherein the time counter runs only when the memory device is active;

determining accuracy of active time previously measured by the memory device over a time period by comparing it with actual time over that time period, wherein inaccuracy is due at least in part to down time of the memory device;

adjusting the measured active time based on the determined accuracy; and adding the adjusted measured active time to the last time stamp received.

17. A memory device comprising:
a memory array; and
a processor in communication with the memory array and operative to:
receive a request to validate a digital rights management (DRM) license stored on the memory device;
in response to receiving the request to validate the DRM license but before attempting to validate the DRM license, determine if a new time stamp is needed based on a time stamp update policy (TUP) for the DRM license that specifies when a new time stamp is needed; and
based on a determination that a new time stamp is needed, receive the new time stamp and then attempt to validate the DRM license using a time estimate based on the new time stamp.

18. The memory device of claim 17, wherein the processor is further operative to:
if the new time stamp is not needed, attempt to validate the DRM license using a time estimate based on a last time stamp received by the memory device.

19. The memory device of claim 17, wherein the TUP comprises one or more of the following parameters: a number of power cycles of the memory device since a last time stamp received by the memory device, active time of the memory device since the last time stamp, and stretched active time of the memory device since the last time stamp.

20. The memory device of claim 17, wherein the processor is further operative to:
receive a request to validate a second DRM license stored on the memory device;
before attempting to validate the second DRM license, determine if a new time stamp is needed based on a second TUP; and
based on a determination that a new time stamp is needed, receive the new time stamp and then attempt to validate the second DRM license using a time estimate based on the new time stamp.

21. The memory device of claim 17, wherein the new time stamp is generated by a time server.

22. The memory device of claim 17, wherein the new time stamp is generated by a host device connected with the memory device.

23. The memory device of claim 17, wherein the memory device stores digital rights management (DRM) keys and licenses to unlock protected content stored on the memory device.

24. The memory device of claim 17, wherein the processor is further operative to, prior to receiving the request to validate the DRM license:
receive a request to authenticate an entity;
before attempting to authenticate the entity, determine if a new time stamp is needed based on a second TUP; and
based on a determination that a new time stamp is needed, receive the new time stamp and then attempt to authenticate the entity using a time estimate based on the new time stamp.

25. The memory device of claim 17, wherein the processor is further operative to:
based on a determination that a new time stamp is not needed, attempting to validate the DRM license using a time estimate based on a last time stamp received by the memory device, wherein the time estimate based on the last time stamp received is generated by:
measuring active time of the memory device with respect to the last time stamp received using a time counter in the memory device, wherein the time counter runs only when the memory device is active;
determining accuracy of active time previously measured by the memory device over a time period by comparing it with actual time over that time period, wherein inaccuracy is due at least in part to down time of the memory device;
adjusting the measured active time based on the determined accuracy; and
adding the adjusted measured active time to the last time stamp received.

26. A memory device comprising:
a memory array; and
a processor in communication with the memory array and operative to:
receive a request to validate one of a plurality of digital rights management (DRM) licenses stored on the memory device;
in response to receiving the request to validate the one of the plurality of DRM licenses but before attempting to validate the one of the plurality of DRM licenses, determine if a new time stamp is needed based on a time stamp update policy (TUP) for the one of the plurality of DRM licenses that specifies when a new time stamp is needed;
based on a determination that a new time stamp is needed, receive the new time stamp and then attempt to validate the one of the plurality of DRM licenses using a time estimate based on the new time stamp.

27. The memory device of claim 26, wherein the processor is further operative to:
if the new time stamp is not needed, attempt to validate the one of the plurality of DRM licenses using a time estimate based on a last time stamp received by the memory device.

28. The memory device of claim 26, wherein the TUP comprises one or more of the following parameters: a number of power cycles of the memory device since a last time stamp received by the memory device, active time of the memory device since the last time stamp, and stretched active time of the memory device since the last time stamp.

29. The memory device of claim 26, wherein the new time stamp is generated by a time server.

30. The memory device of claim 26, wherein the new time stamp is generated by a host device connected with the memory device.

31. The memory device of claim 26, wherein the memory device stores digital rights management (DRM) keys and licenses to unlock protected content stored on the memory device.

32. The memory device of claim 26, wherein the processor is further operative to, prior to receiving the request to validate the one of the plurality of DRM licenses:
receive a request to authenticate an entity;

before attempting to authenticate the entity, determine if a new time stamp is needed based on a second TUP; and based on a determination that a new time stamp is needed, receive the new time stamp and then attempt to authenticate the entity using a time estimate based on the new time stamp.

33. The memory device of claim 26, wherein the processor is further operative to:

based on a determination that a new time stamp is not needed, attempting to validate the one of the plurality of DRM licenses using a time estimate based on a last time stamp received by the memory device, wherein the time estimate based on the last time stamp received is generated by:

measuring active time of the memory device with respect to the last time stamp received using a time counter in the memory device, wherein the time counter runs only when the memory device is active;

determining accuracy of active time previously measured by the memory device over a time period by comparing it with actual time over that time period, wherein inaccuracy is due at least in part to down time of the memory device;

adjusting the measured active time based on the determined accuracy; and adding the adjusted measured active time to the last time stamp received.

* * * * *